June 22, 1954

G. W. HOPKINS ET AL 2,681,765

VALVE INDEXING MECHANISM

Filed Jan. 31, 1950

INVENTORS.
GEORGE W. HOPKINS
ARTHUR J. MALAVAZOS

BY

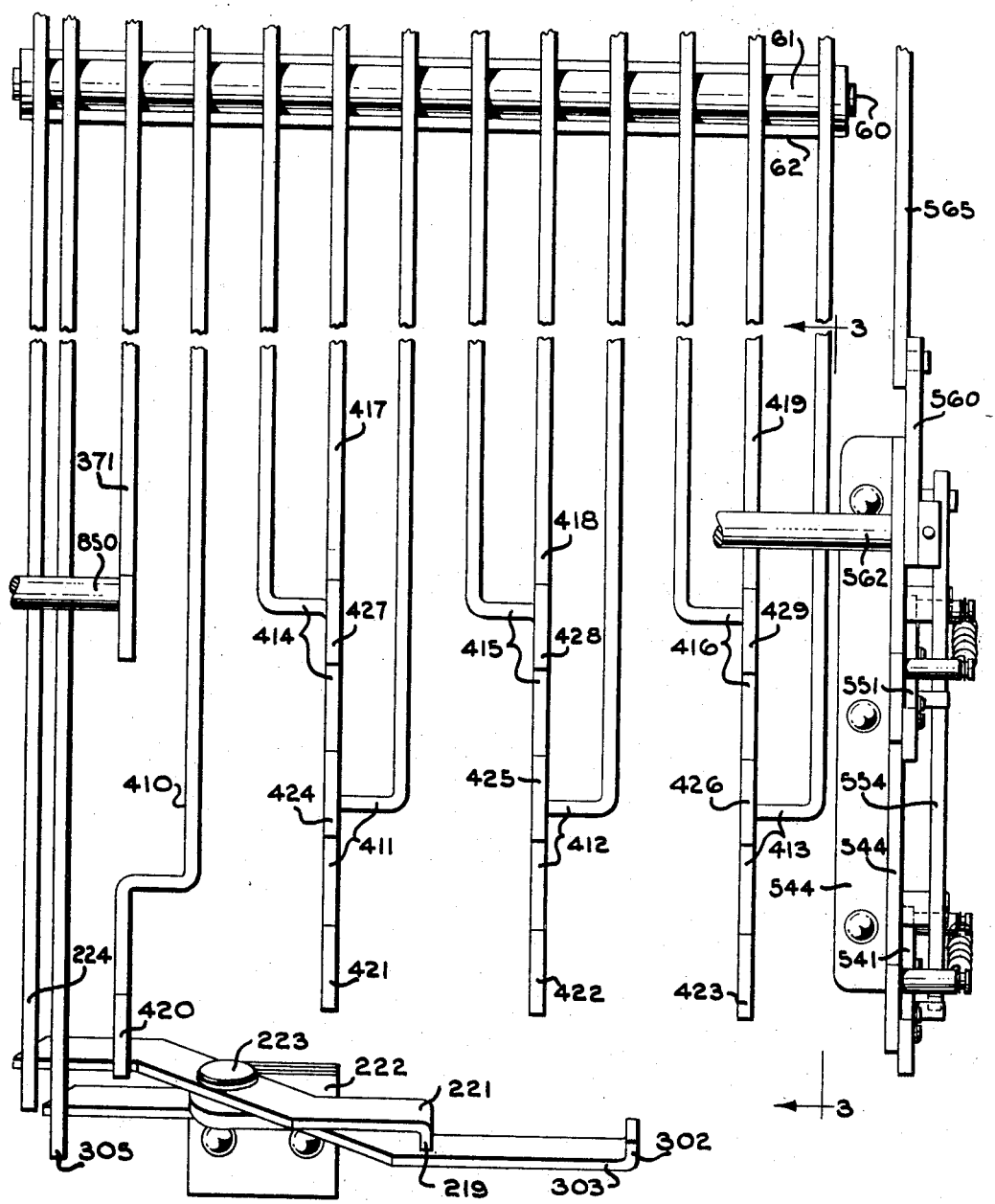

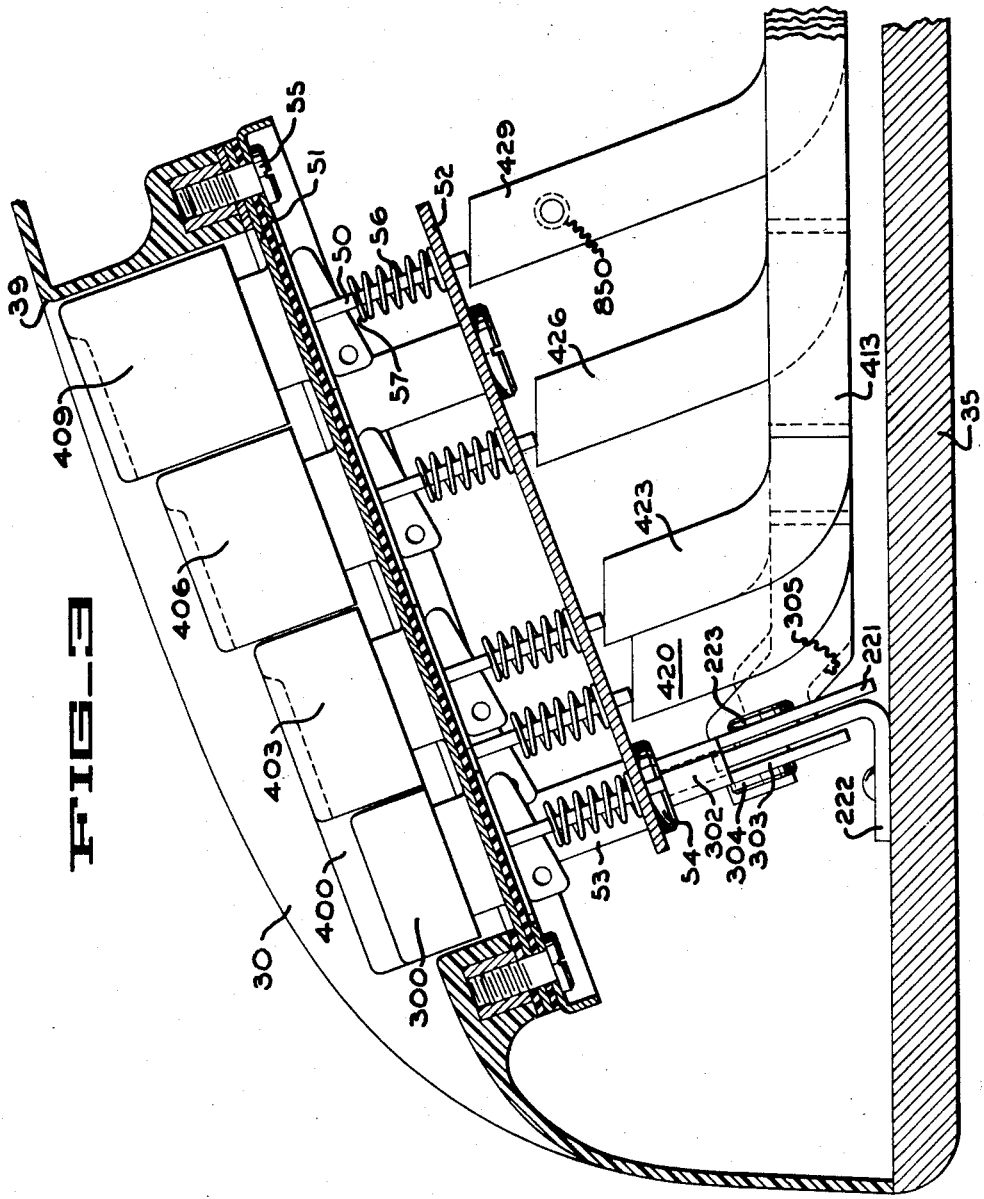

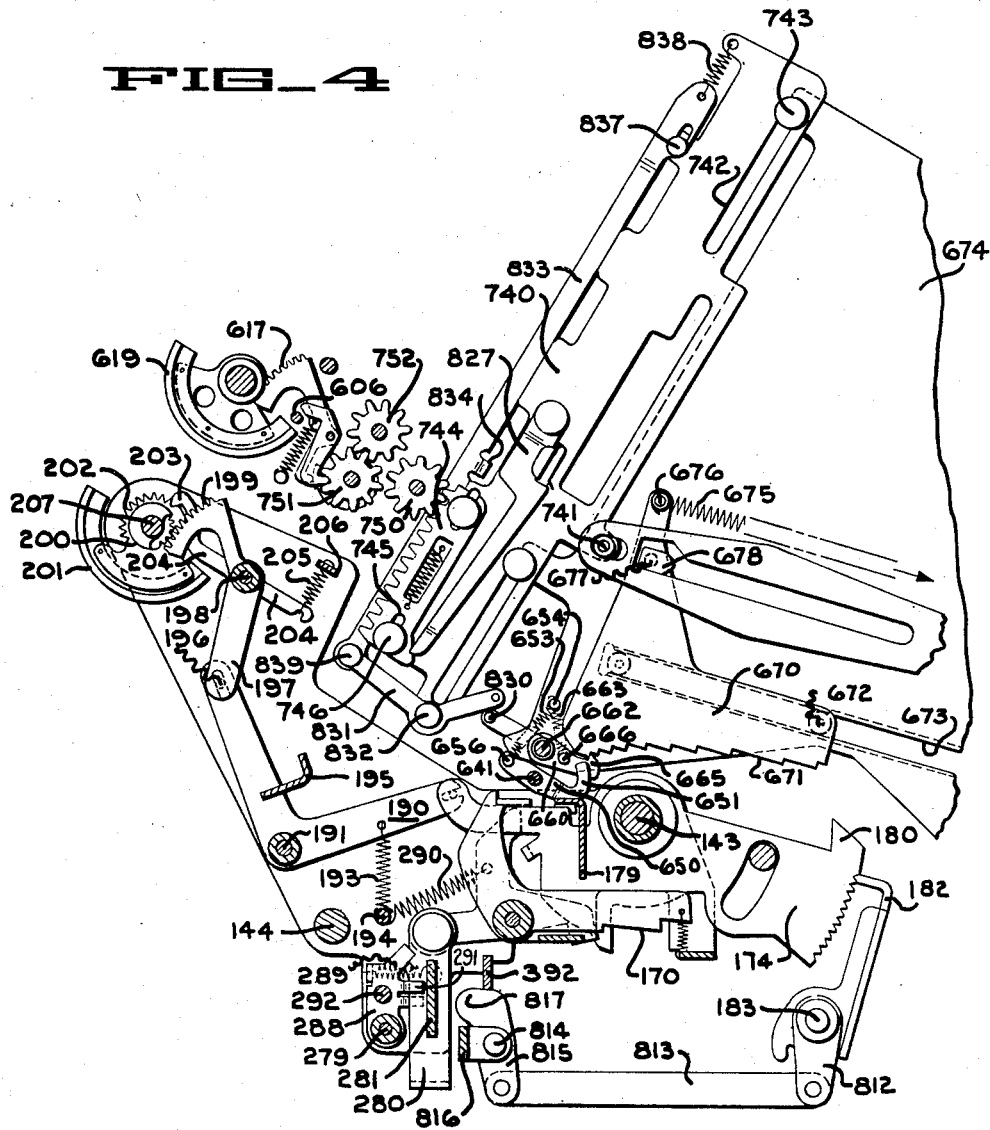
FIG_4
INVENTORS.
GEORGE W. HOPKINS
ARTHUR J. MALAVAZOS
BY

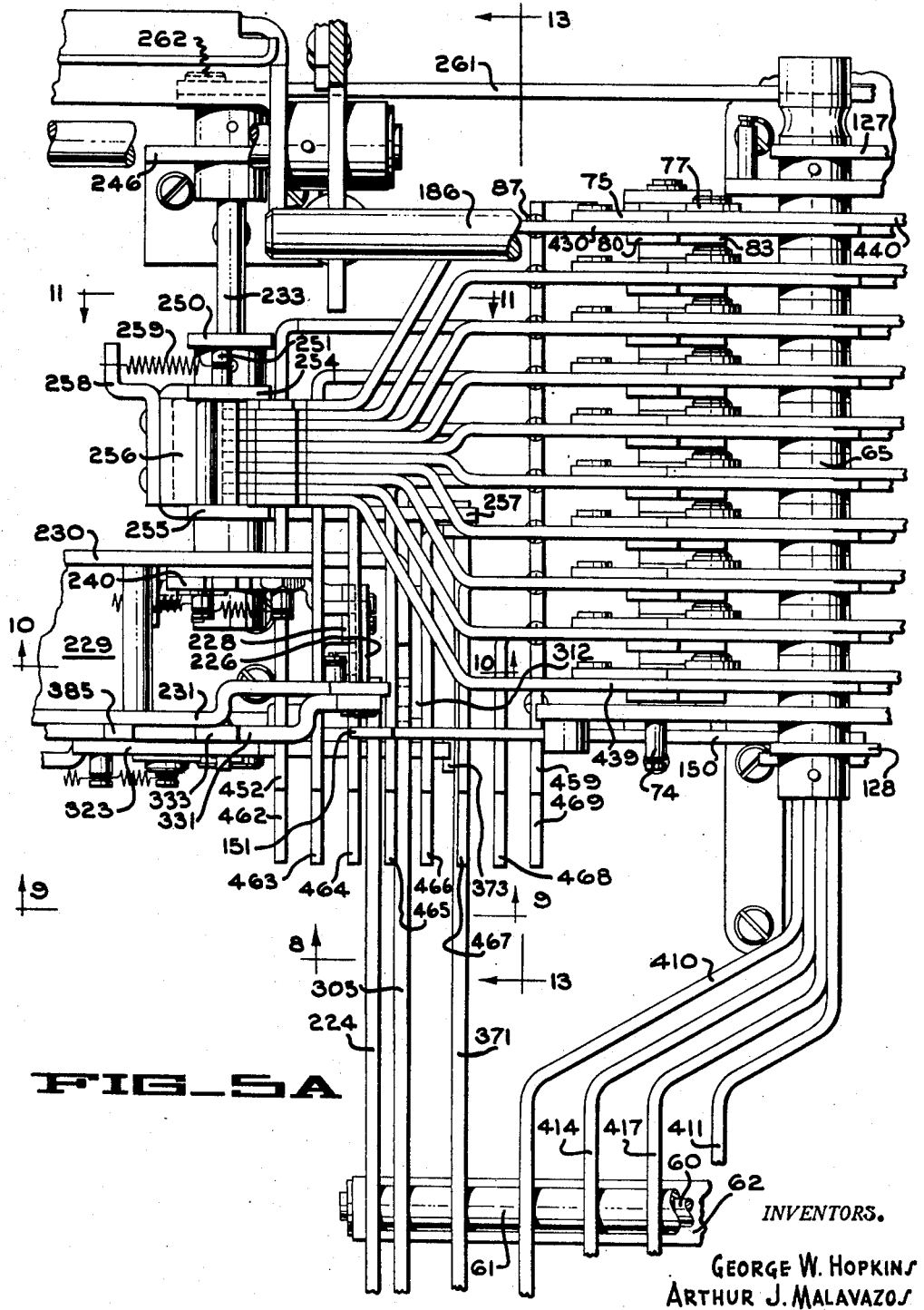

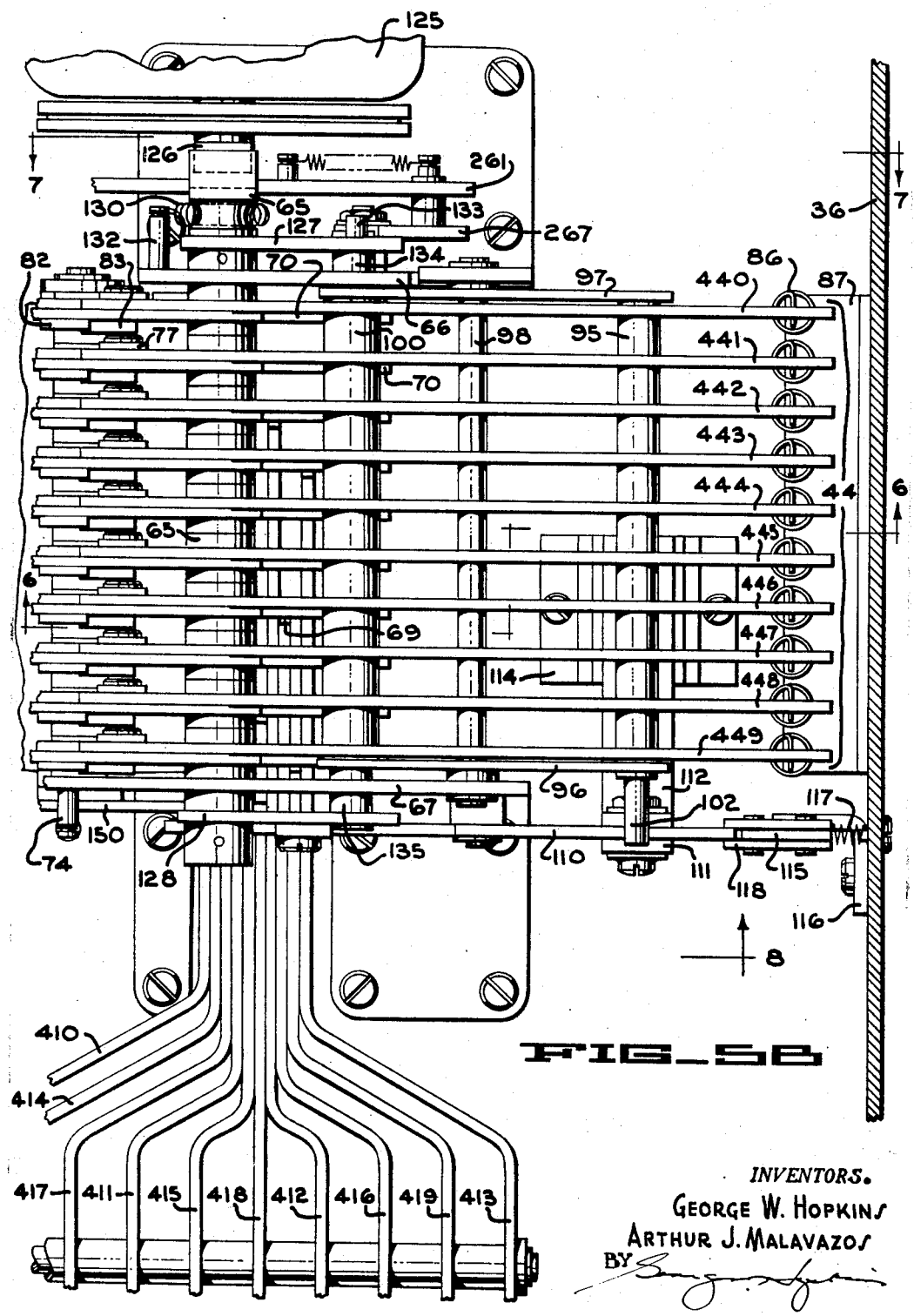

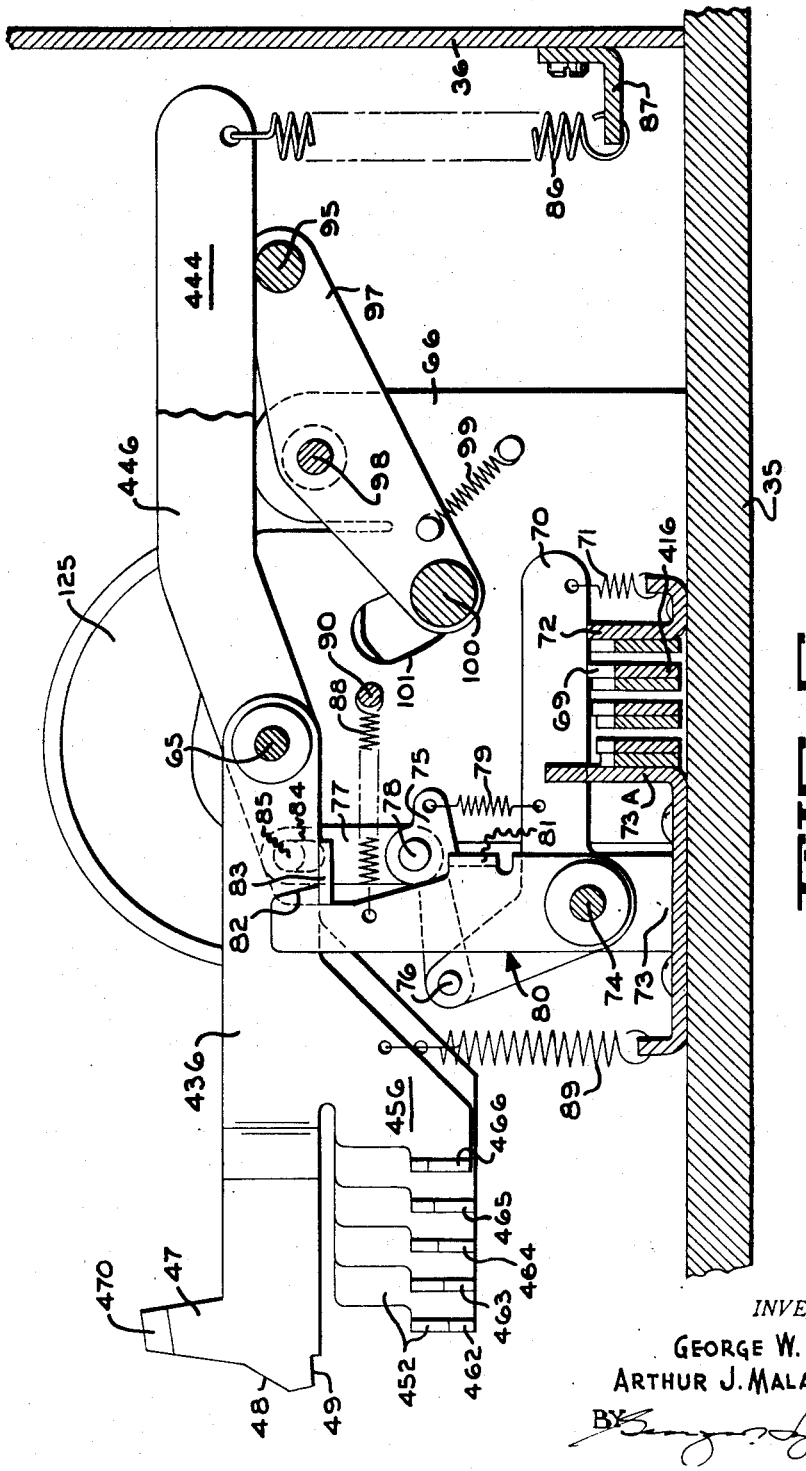

June 22, 1954

G. W. HOPKINS ET AL 2,681,765

VALVE INDEXING MECHANISM

Filed Jan. 31, 1950

INVENTORS.
GEORGE W. HOPKINS
ARTHUR J. MALAVAZOS
BY

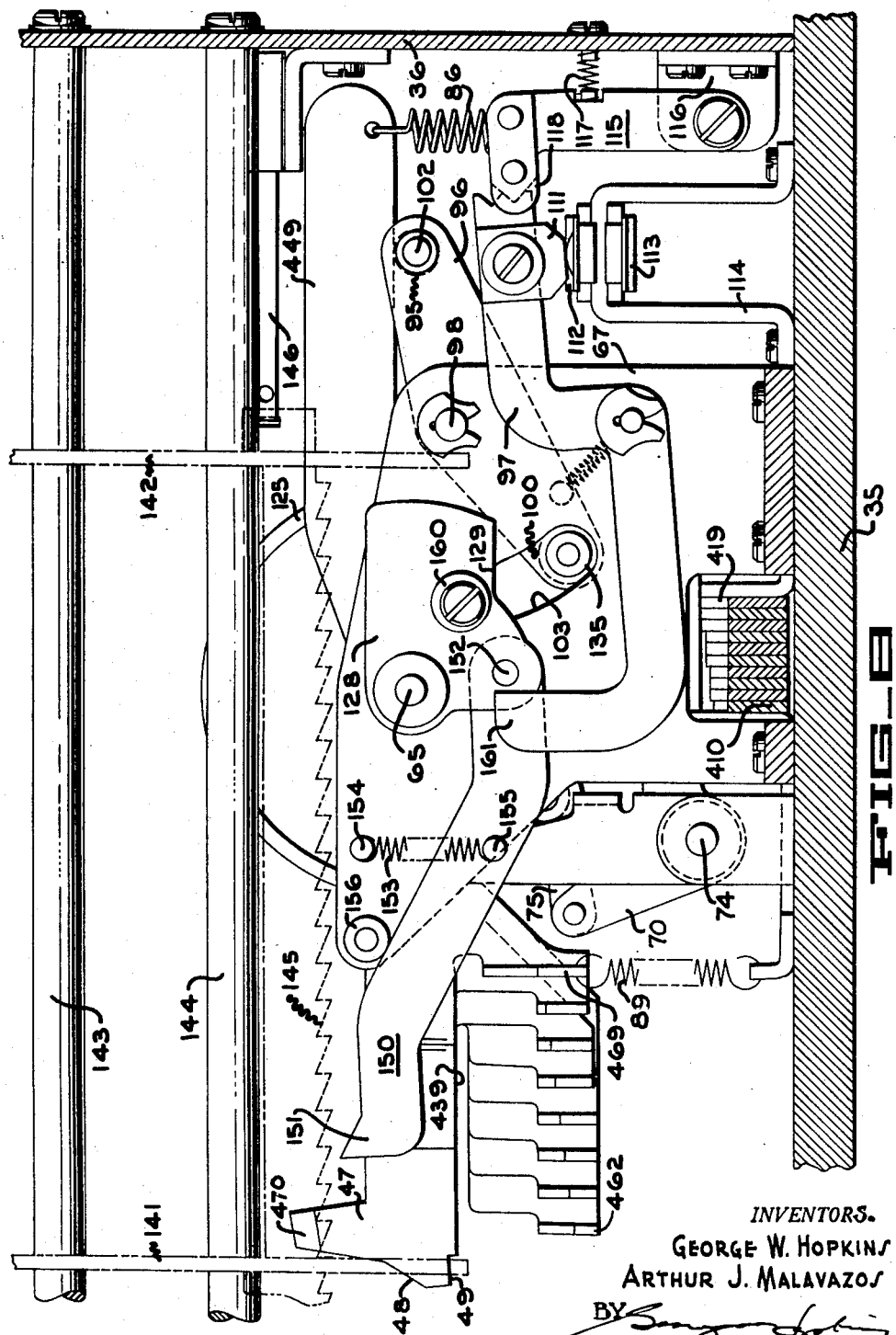

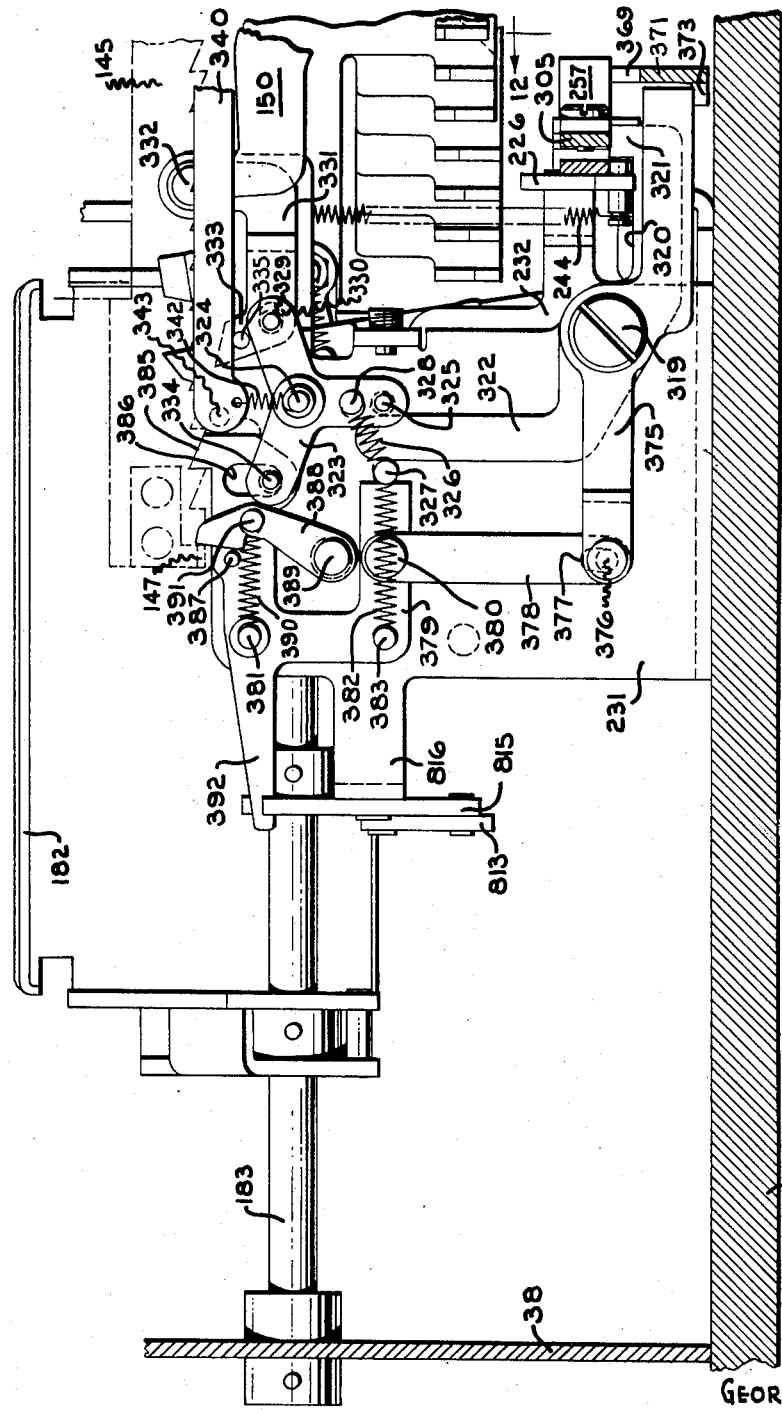

June 22, 1954  G. W. HOPKINS ET AL  2,681,765
VALVE INDEXING MECHANISM
Filed Jan. 31, 1950  16 Sheets-Sheet 11
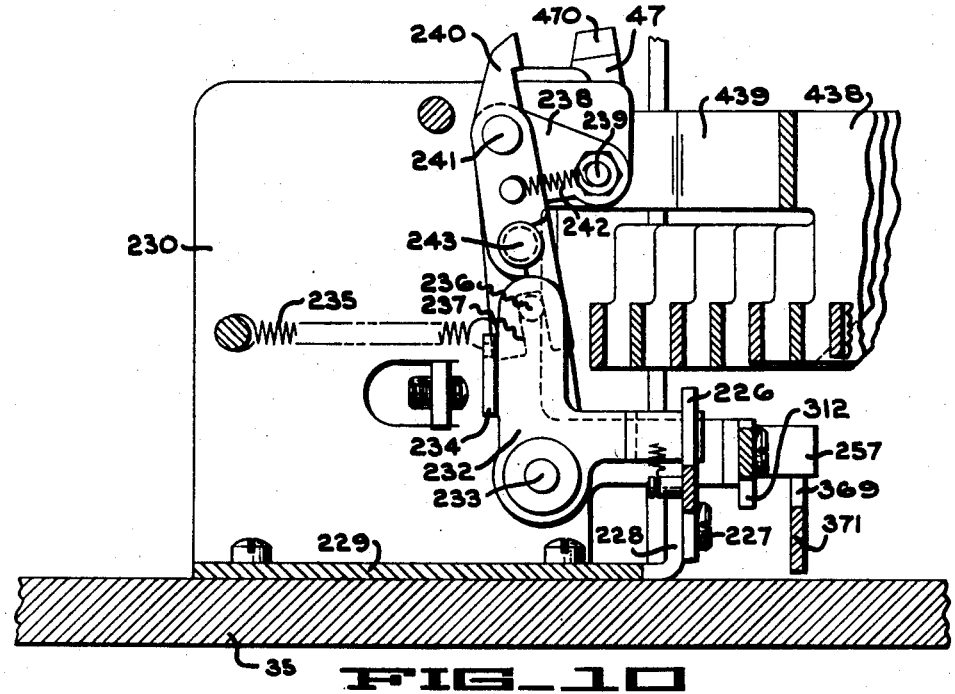
FIG_10
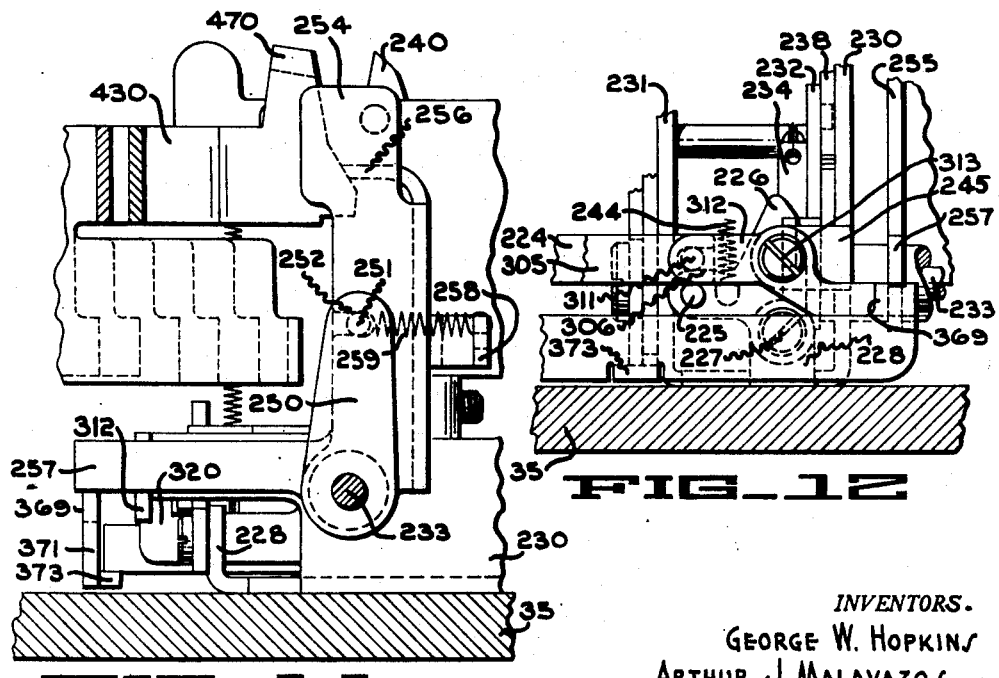
FIG_11  FIG_12
INVENTORS.
GEORGE W. HOPKINS
ARTHUR J. MALAVAZOS
BY

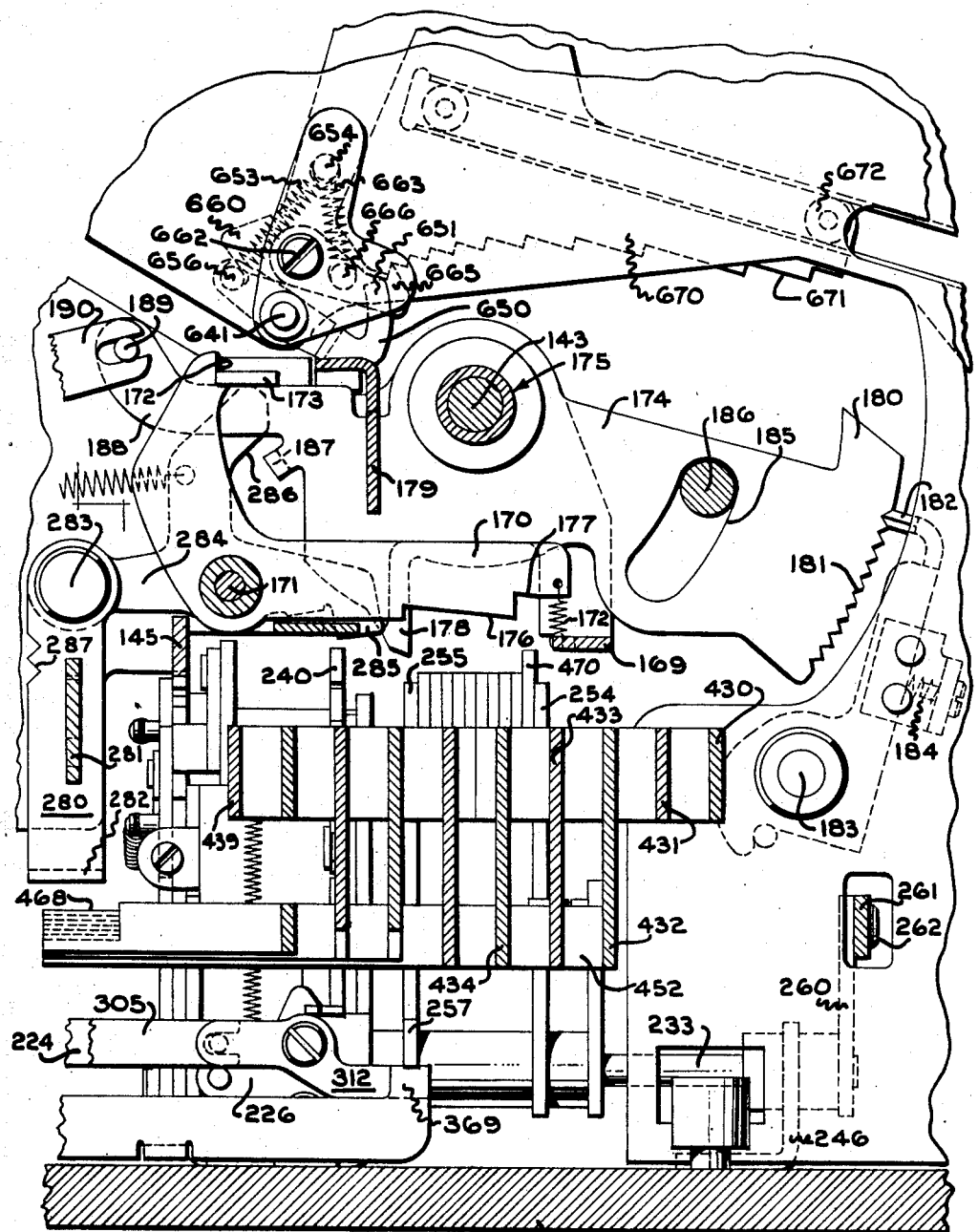
FIG_13

June 22, 1954
G. W. HOPKINS ET AL
2,681,765
VALVE INDEXING MECHANISM
Filed Jan. 31, 1950
16 Sheets-Sheet 13
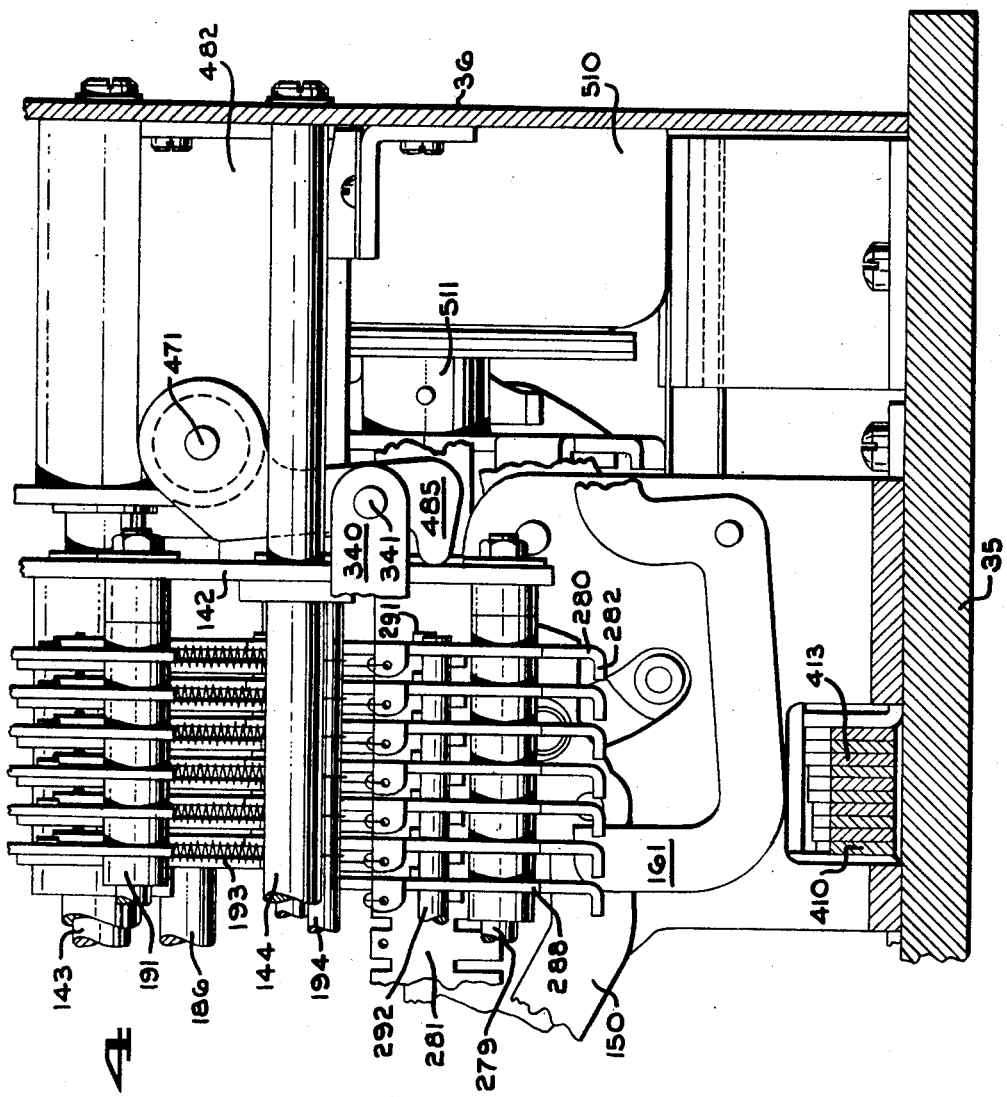
INVENTORS.
GEORGE W. HOPKINS
ARTHUR J. MALAVAZOS
BY

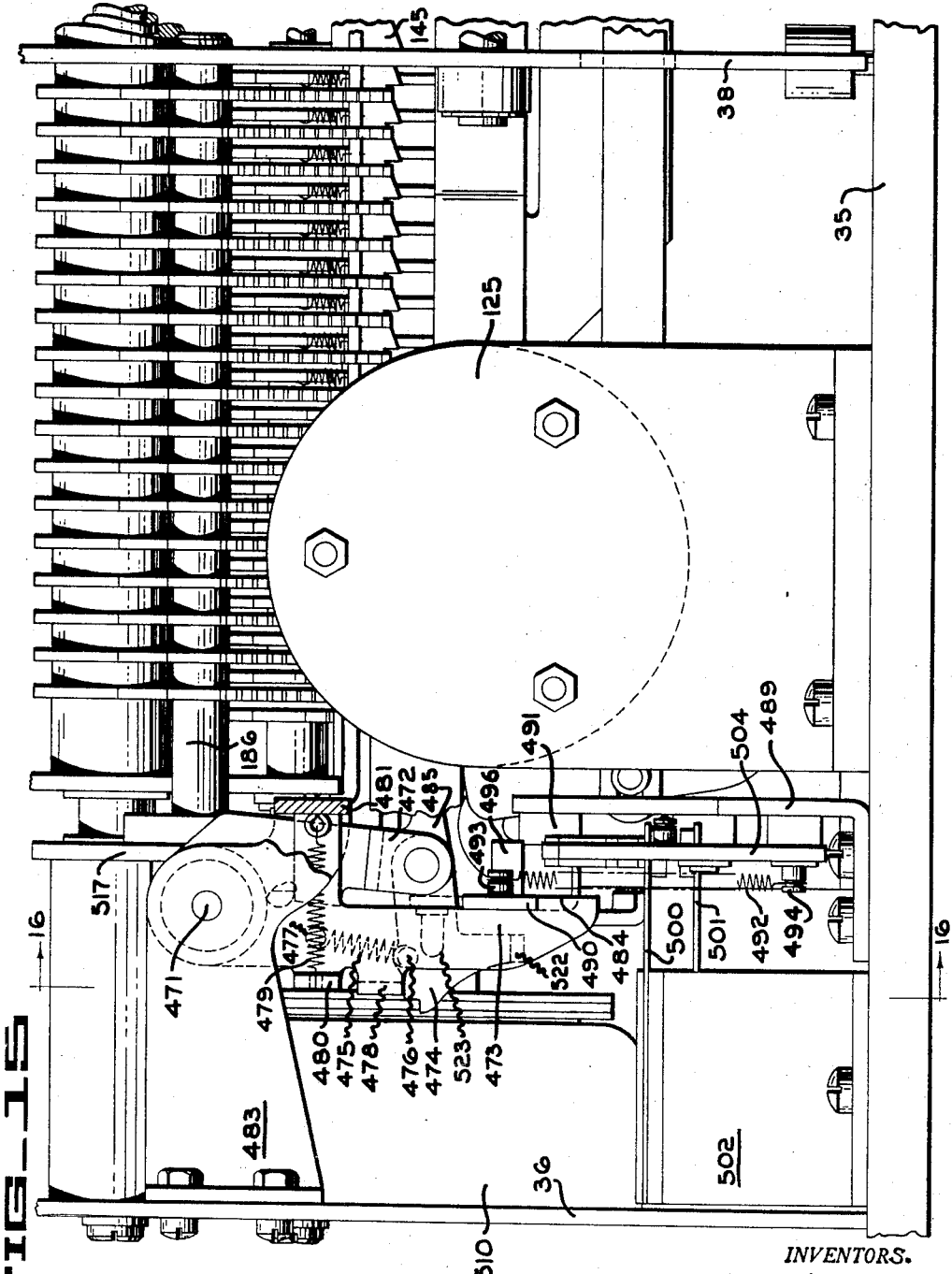

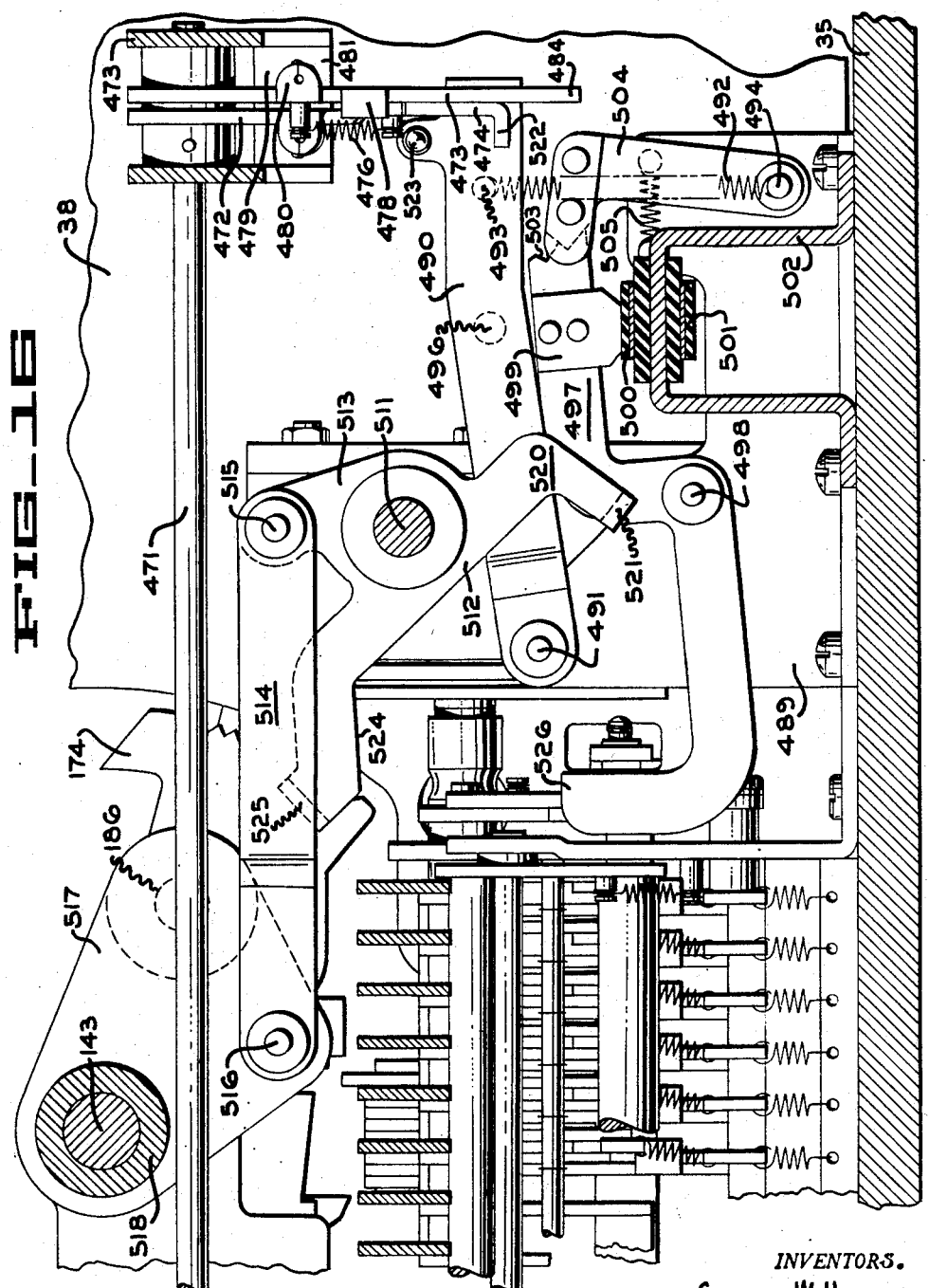

June 22, 1954
G. W. HOPKINS ET AL
2,681,765
VALVE INDEXING MECHANISM
Filed Jan. 31, 1950
16 Sheets-Sheet 16
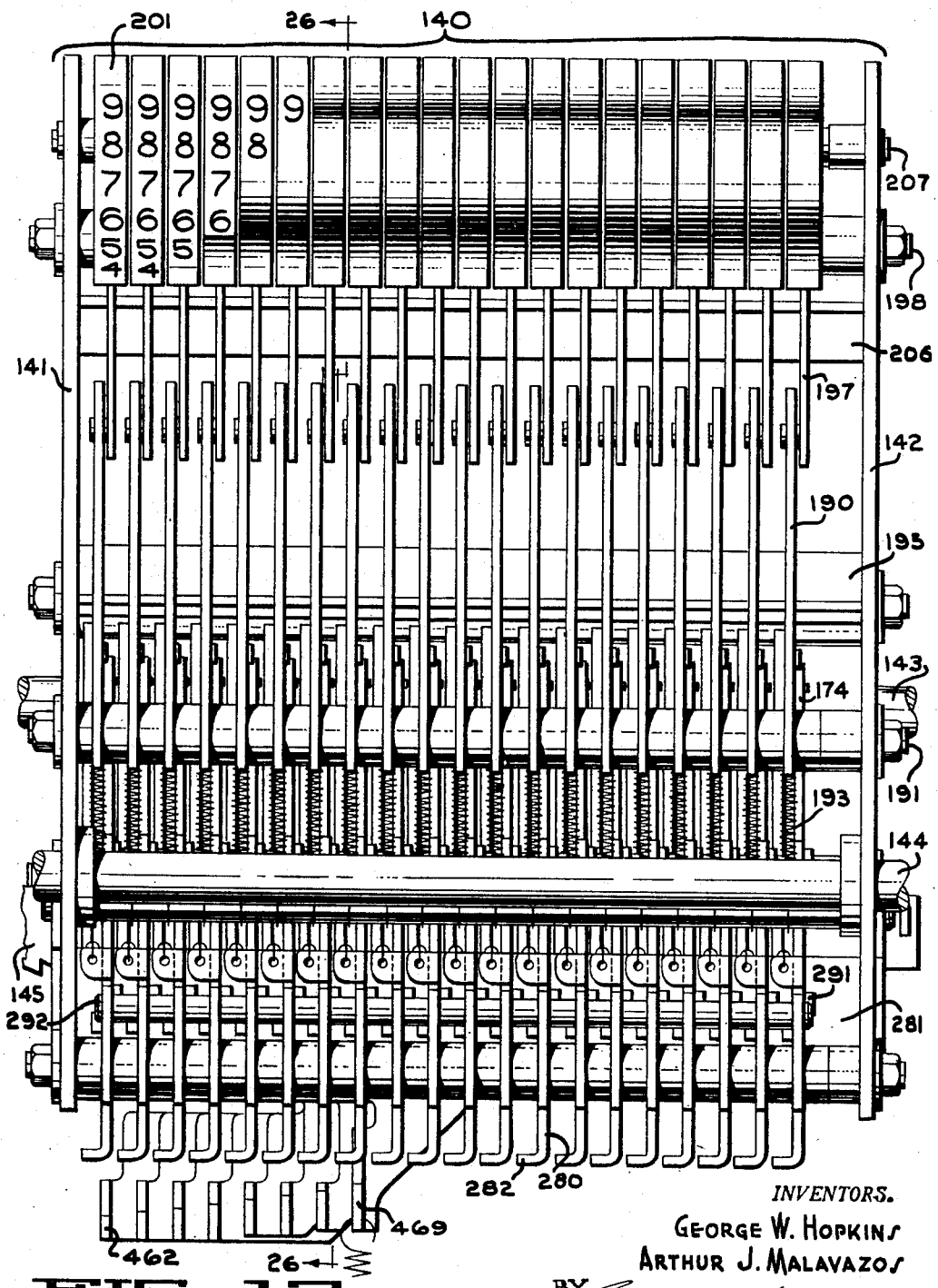
FIG_17
INVENTORS.
GEORGE W. HOPKINS
ARTHUR J. MALAVAZOS
BY Patented June 22, 1954

2,681,765

UNITED STATES PATENT OFFICE 2,681,765

VALUE INDEXING MECHANISM

George W. Hopkins, San Leandro, and Arthur J. Malavazos, Oakland, Calif., assignors to Friden Calculating Machine Co., Inc., a corporation of California Original application November 7, 1949, Serial No. 125,872. Divided and this application January 31, 1950, Serial No. 141,508

22 Claims. (Cl. 235—63)

This invention relates to a selection mechanism for a ten key calculating machine and is a division of the co-pending application of the two applicants herein and Donald L. Rolph, Serial No. 125,872, filed November 7, 1949, which has been abandoned in favor of the continuation-in-part application S. N. 189,842, filed October 12, 1950, and is related to the co-pending application S. N. 141,507, of George W. Hopkins, one of the applicants herein, and Donald L. Rolph. This application relates specifically to a selection mechanism for placing values in an internal carriage and the positioning of such carriage preparatory to digitation; the related application of Hopkins and Rolph just mentioned specifically describes and claims the digitation mechanism particularly suitable for utilizing such values; while the parent application, although describing the complete machine (and thus the features of each of the related parts thereof) formed by the combination of the mechanisms of this and the related Hopkins and Rolph applications, contains only claims directed to the entire machine, and particularly to the cooperation, or interaction of parts, of this and the related Hopkins and Rolph applications.

The primary object of the present invention is to provide an improved selection mechanism for an adding machine.

Another important object of this invention is to provide a compact selection mechanism for a small adding machine, the mechanism having a short key stroke and capable of handling factors of considerable size. In one embodiment of this invention a machine of an overall width of about ten inches was capable of handling factors of twenty digits.

Another important aspect of this invention is the provision of a "light key touch" adding and subtracting machine, i. e., one in which the keys are easily operated. In the present instance we prefer to latch the selecting and control mechanisms against spring pressure tending to operate them, and initiate operation by unlatching the mechanism. Combined therewith is a new and improved restoring means, preferably operated by rotary solenoids to restore parts to normal, or latched, positions, and to effect the necessary movement of parts, incident to setting a factor into the machine.

Another important feature is the provision of a simple and highly flexible "multiple zero" mechanism in which any number of zeros can be entered automatically into a factor by depression of a multiple zero key and the numeral key representing the number of zeros desired to be entered. Such a mechanism avoids the insertion of a plurality of zeros by separately "pumping" them in one-by-one, and permits them all to be entered from a single stroke of the hand.

Another important object of this invention is to provide a back spacing mechanism, operated by depression of a back spacing key, which is effective to erase only the last of a number of digits then standing in the selection mechanism.

Another object of the present invention is to provide an improved value selection and value storing mechanism whereby a number (even one containing a great many digits) can be set up from a ten-key keyboard quickly and easily and stored in settable value selection plates or segments from which the value may be transferred into the accumulator as desired.

These and other objects of the present invention will be disclosed in the specification and claims which follow:

Throughout the specification the "front" of the machine is that part closest to the operator during normal operation thereof; the "back" or "rear" is that part furthest from the operator; and the "right" or "left" the sides to the operator's right or left, respectively, as the operator faces the front of the machine. Obviously, in views from the rear (such as in Fig. 7) the right side will appear at the left of the figure. Also, "longitudinal" is used as indicative of something extending from front to back; and "transverse" as extending from left to right across the machine.

The present invention will be readily understood from a reference to the drawings. It can be here noted that the drawings herein are substantially exact duplicates of Figs. 1 to 3, inclusive, 26 and 5A to 17, inclusive, respectively of the above-mentioned parent application Serial No. 189,842. Reference characters on these drawings which are not referred to in the present specification are those reference characters in such parent application, and the parts so indicated are described in the parent application.

Fig. 2 is an enlarged detail plan view of the selection levers, immediately under the keyboard which is seen on the lower right hand corner of Fig. 1.

Fig. 3 is a vertical cross sectional view on an enlarged scale, taken from the right hand side of the keyboard on the vertical longitudinal plane indicated by the line 3—3 of Fig. 2.

Fig. 4 is a fragmentary right side elevation through the carriage and registering mechanism taken on a vertical longitudinal plane through the machine immediately to the left of the central supporting plate.

Figs. 5A and 5B are overlapping partial plan views of the selection levers operated by the numeral keys: Fig. 5A being the left hand portion and Fig. 5B being the right hand portion of this mechanism.

Fig. 6 is a front view of a selection arm and its associated mechanism, taken along the vertical transverse plane indicated by the line 6—6 of Fig. 5B.

Fig. 8 is a front view of the carriage shifting mechanism, being taken on a transverse vertical plane immediately behind the keyboard, such as indicated by the line 8—8 in Figs. 5A and 5B.

Fig. 9 is a front view of the carriage latching mechanism, showing mechanism immediately to the left of that shown in Fig. 8, such as along the vertical transverse plane indicated by line 9—9 of Fig. 5A.

Fig. 10 is a front view of a detail of the control mechanism taken along the vertical plane indicated by the transverse line 10—10 of Fig. 5A.

Fig. 11 is a rear view of a detail of the control mechanism taken along the vertical transverse plane indicated by the line 11—11 of Fig. 5A.

Fig. 12 is a right side view of a detail of the control mechanism taken along a vertical longitudinal plane immediately to the right of the lower right-hand corner of the mechanism shown in Fig. 9.

Fig. 13 is a cross sectional view, from the right side of the selection mechanism and the internal carriage, taken along the vertical longitudinal plane indicated by the lines 13—13 of Fig. 5A, and showing particularly the relationship between the two mechanisms.

Fig. 14 is a front elevation, similar to Fig. 8 but with the carriage shown in its home position and with certain parts eliminated for clarification.

Fig. 15 is a rear view of the mechanism shown in Fig. 14 showing particularly the control for operating the selection segment restoring solenoid.

Fig. 16 is a right side view taken along the longitudinal vertical plane indicated by the line 16—16 of Fig. 15 and showing particularly the mechanism operative to clear a factor from the selection segments.

Fig. 17 is an enlarged front view of the carriage.

General arrangement

Figure 1:
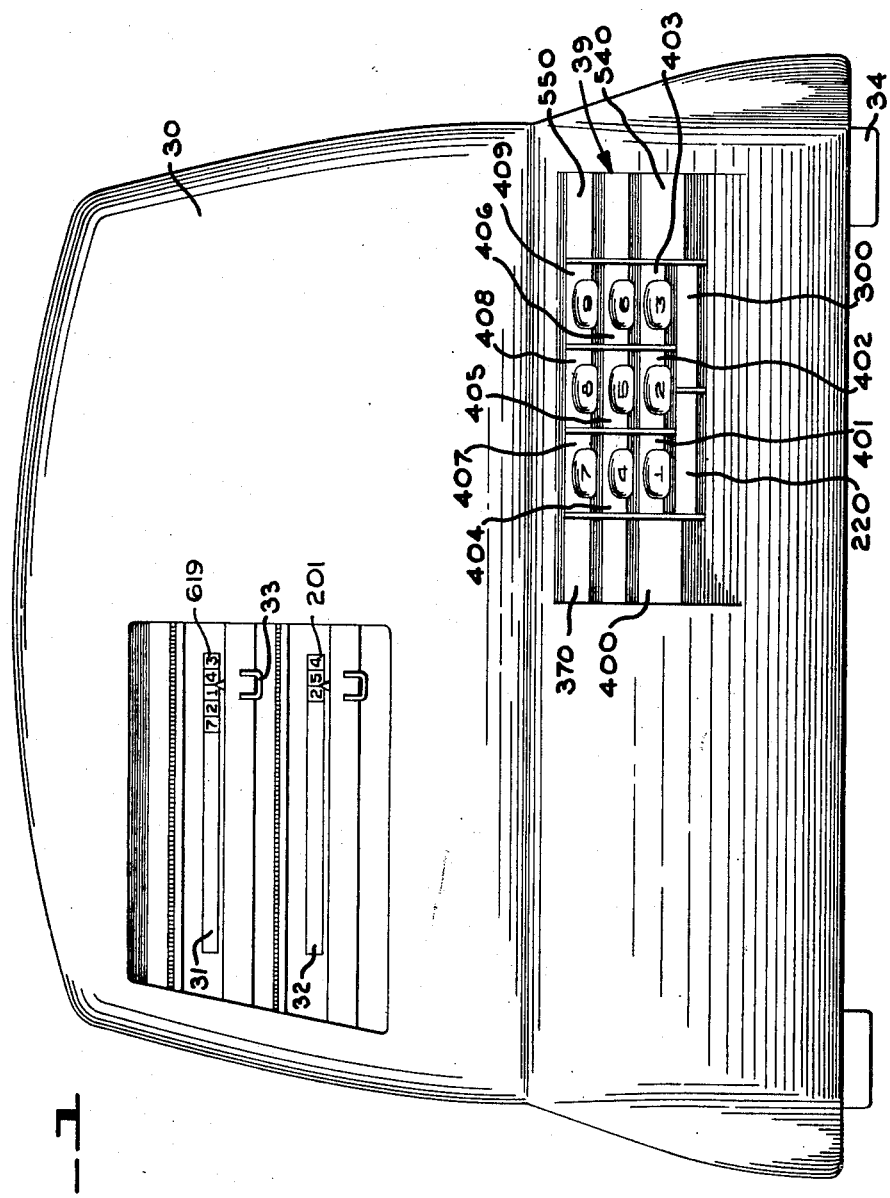
Fig. 1 is a front view of the adding machine of this invention.

The adding machine of the present invention is shown in Fig. 1. The machine is preferably enclosed in a customary cover plate 30. In the upper left-hand corner of the cover plate is a suitable rectangular aperture 31 for the display of totals accumulated in the machine, or a plurality of such apertures if a plurality of registers is desired. Below the aperture 31 is a second aperture 32 for the display of the factor then being set up in the machine, i. e., for display of "check dials." Slidable decimal indicators 33 may be mounted adjacent the apertures for indicating decimal points in the check dials and register dials. Preferably the machine is mounted on a plurality of rubber feet 34.

The general arrangement of the mechanisms is as follows: The keyboard comprising the zero key 400 and the 9 numeral keys 401 to 409, inclusive, and the control keys are arranged in the lower right hand front face of the machine, as shown in Fig. 1. Preferably the value and control keys are mounted in a removable assembly, as shown in Fig. 3, which is inserted through a suitable opening 39 in the lower right hand face of the cover plate.

The register dials 619 and aperture 31, and the check dial aperture 32 are located in the upper left hand corner of the face of the machine. The check dials 201 are carried by the internal carriage, hereinafter described, while the register dials are rotatably but non-shiftably mounted in the machine. The internal carriage lies transversely in the machine, and is located slightly below the level of the check dials, and in its home position is located to the right of the aperture 32, i. e., somewhat above the keyboard. In this position, no figures can be visible in the check dial aperture 32. The selection mechanism for transposing values selected by depression of the value keys into the internal carriage lies behind and below the keyboard. It will be understood that with the insertion of values into the internal carriage, it (the carriage) is shifted ordinarily to the left, disclosing the values so inserted in the check dials, digit by digit, as they are entered.

The accumulating mechanism is located behind and below the aperture 31, and utilizes the values inserted into the carriage for adding to or subtracting from the values standing in the accumulator. In digitation, the accumulating mechanism for each order of the register is differentially operated according to the value standing in the carriage in the same order. In the example shown in Fig. 1, only the first three orders from the right will be operative to add or subtract the figure shown in the check dials, to the corresponding orders of the register. While all of the actuating levers (one for each order of the register) are driven during digitation, only the levers in the orders in which a digit is shown in the check dials are effective to cause direct operation in the register. Of course, there is a tens-carry mechanism, which is operative to the left of the actuated accumulating mechanism, and this carry mechanism is operative throughout the full width of the register.

The mechanism of the machine is mounted upon a base plate 35, which in turn is supported by the feet 34. Mounted on the base plate 35 are preferably three supporting plates, a right side plate 36 (Fig. 5B), a left side plate 37 and a center supporting plate 38 (such as shown in Fig. 9). Other mechanisms will be supported upon the brackets mounted upon the base plate or on the three major supporting plates as will be from time to time described.

Value selection

Values to be entered into the machine are entered by means of a zero key 400 and value keys 401 to 409, inclusive. The value keys, together with necessary control keys are grouped together in the lower right hand corner of the front of the machine, as shown in Fig. 1. Associated with the keys 400 to 409, inclusive, are the selection levers 410 to 419, inclusive. (Figs. 2 and 3.) For purposes of simplification the last digit of the reference characters referring to the numeral keys and the selection mechanism down to the travelling carriage described hereinafter, refer to the value of the key to which such mechanism is associated. For example, the lever 410 is associated with the numeral key 400 for entry of 0; the lever 411 with the key 401 entering the value 1, etc. The forward end of the value entering levers 410 to 419 are provided with upraised ends 420 to 429, respectively, preferably terminating (as shown in Fig. 3) immediately below the key stems 50 associated with each of the numeral keys.

The keyboard of the present machine is preferably of the self-sealing type disclosed in the co-pending application of Hopkins Serial No. 54,921, now Patent No. 2,559,820. In this type of keyboard assembly (shown in Fig. 3) the keyboard can be assembled separately, and apart from the machine, and inserted into the opening 39 of the machine quite readily. The keys 400 to 409, inclusive, are mounted upon ten identical key stems 50 which are slidably mounted in an upper plate 51 and a lower plate 52. The plates 51 and 52 are separated by spacers 53 and held in rigid spaced relationship by machine studs 54. The assembly is suitably mounted in the cover 30 by any suitable means such as studs 55. The keys are normally maintained in their raised positions by suitable compression springs 56 surrounding each key stem and placed between the bottom plate 52 and a pin 57 in each key stem. As mentioned previously, the forward ends of the key levers 410 to 419, inclusive, are bent upwardly so as to immediately underlie the key stems 50.

It will be seen by reference to Fig. 2 that three of the key levers (preferably 417, 418 and 419) extend straight back, while the others are bent at inverted right angles to provide suitable clearance. As shown in Fig. 2 the key levers 414, 415 and 416 are bent to lie to the left of the key levers 417, 418 and 419, respectively; and key levers 411, 412 and 413 are bent to lie to the right. Behind the keyboard the ten levers are parallel and spaced apart as shown. All of the levers are pivotally mounted on a transverse shaft 60 journalled in a bracket 62 secured to the base plate. The levers are separated by suitable spacers, or sleeves, 61. The rear ends of the key levers are bent to permit their rear ends to lie in juxtaposition, as is shown in Figs. 5A and 5B.

The rear ends of the levers 410 to 419, inclusive, terminate in ears 69 positioned at points differentially spaced from one another, as shown in Fig. 5B. In the embodiment shown, the lever 419 terminates closest to the front and the lever 410 terminates furthest to the rear. The terminal ears, or lugs, 69 terminate at stepped elevations, as shown in Figs. 6 and 8, in order to provide a uniform amount of rise of such ears irrespective of the difference in radial length from the shaft 60 to the respective ear.

Referring to Figs. 5A, 5B and 6 it will be seen that the key levers 410 to 419, inclusive, are operative to position the selection arms 430 to 439, inclusive, which directly enter the values into the carriage to be described hereinafter. Each of the selection arms is positioned by an actuator arm 440 to 449, inclusive, each of which actuator arms is powered by a spring 86, as hereinafter described. The value key levers 410 to 419 operate to release latches holding the respective actuating arms 440 to 449, whereby the spring 86 operates to raise its respective selection arm. Thus the actual work of setting the selection levers is done by the springs, thus lessening the force required for key depression.

The mechanism for release of the actuator arms 440 to 449, inclusive, to position the selection levers 430 to 439, inclusive, is shown in detail in Fig. 6, which for the most part shows the selection lever for the value "6" (lever 436). It will be understood that each actuator arm is controlled by a separate mechanism, but as these mechanisms are identical only one need be described. The rear end of each of the key levers, 410 to 419, inclusive, as heretofore mentioned, is provided with an upstanding ear 69 which underlies the horizontal arm of a bellcrank 70. The bellcranks 70 are mounted on a common shaft 74 suitably supported by a bracket 73 mounted on the base plate. The right hand edge 73A of the bracket 73 is turned upwardly to form a comb for the proper spacing of the respective bellcranks 70. The upturned comb 73A also serves to confine the rear ends of the levers 410 to 419 against undesirable side motion to the left. A second bracket 72 to the right of the key levers, also mounted on the base plate, serves to prevent bending to the right by the key levers. The second bracket 72 also provides a spring seat for each lower end of a series of springs 71, one of which is affixed to each bellcrank 70 in order to pull the bellcrank in a clockwise direction.

A latch lever 75 is pivotally mounted on the upwardly extending arm of the bellcrank 70 by any suitable means, such as pin, or stud, 76. The right hand end of the latch 75 is supported by a link 77 to which it is pivotally connected, as by pin 78, the link 77 being provided with a slot 84 which embraces a pin 85 on the respective actuating arm (in Fig. 6, on arm 446). The latch 75 is pulled in a clockwise direction by a spring 79 tensioned between the right hand end of the latch and the horizontal arm of bellcrank 70.

Also pivotally mounted on the shaft 74 is a rocking arm 80 which is provided with an ear 81 adapted to be engaged by the latch 75. The upper end of the arm 80 is provided with a nose 82 which engages an ear 83 on the corresponding actuating lever (in Fig. 6, on actuator arm 446). The rocking arms 80 are normally pulled to the right by springs 88 tensioned between the arms and a common bar 90 extending between brackets 66 and 67.

It is thus obvious that depression of any numeral key will raise the rear end of the associated numeral lever to rotate the bellcrank 70 in a counter-clockwise direction. Such movement pulls the latch 75 to the left. The latch 75 is engaged over the ear 81 of the rockable arm 80, thereby pulling the arm 80 in a counter-clockwise direction. Such movement of the arm 80 pulls its nose 82 off the ear 83, thus unlatching the corresponding actuator arm. Each of the actuator arms 440 to 449, inclusive, is pulled in a clockwise direction by means of a heavy spring 86 tensioned between the respective arm and a common bracket 87 mounted on the right hand supporting wall 36. Thus depression of a key serves to unlatch the corresponding actuator arm and permit spring 86 to pull the actuating lever in a clockwise direction.

The various selection arms 430 to 439, inclusive, and their associated actuating arms 440 to 449, inclusive, respectively, lie immediately adjacent each other and are both loosely mounted on the longitudinal shaft 65. The hubs of these two arms provide suitable spacing of the mechanism. The selection arm (436 in Fig. 6) lies between its actuator arm (446 in Fig. 6) and the associated rotatable arm 80. Thus, the arm 436 overlies the ear 83 on the associated actuator arm 446, so that the rotation of the actuator arm, when the nose 82 is unlatched from the ear 83, lifts the associated selection arm (436 in Fig. 6), likewise in a clockwise direction.

The selection arms 430 to 439 are normally pulled counter-clockwise by means of light springs 89, tensioned between the arms and the bracket 73. The spring 86 is considerably stronger than the spring 89, so the former will rock both arms clockwise immediately upon the nose 82 being pulled off the ear 83.

The left, or free, end of the selection arm is provided with an upstanding nose 47. It can be mentioned, as will be obvious from a perusal of Fig. 13, that the noses 47 of the various arms terminate in a single plane with the exception of the nose 470, associated with the "0" selection arm, which rises to an elevation somewhat above the others for a purpose to be hereinafter mentioned. The nose of the selection lever is provided with a camming face 48 and with a latching notch 49 adapted to cooperate with the detent 250, shown in Fig. 11. The detent, as is shown in Fig. 5A, is of modified U shape having two sides 254 and 255 enclosing the ends of the selection arms, and having the central portion 256 turned under the form a nose which is cammed outwardly during upward movement of a selection arm and then immediately engages the notch 49 to latch the selection arm in its raised position. The detent carries a spring arm 258 on which is mounted a spring 259, the other end of which spring engages shaft 251 and thus normally urges the detent in a latching direction (counterclockwise in Fig. 11).

It will be obvious that upon depression of a key and the unlatching of the actuator arm, the selection segment arm of the selection arm is raised and latched in the raised position. This raising is utilized, as will hereinafter be explained, to enter the corresponding value in the selection segments mounted in the travelling carriage. As each value is entered, the upward motion of the selection arm moves the detent to release whatever arm had theretofore been latched in raised position. Thus, only one selection arm at a time will be in raised position, but any arm so raised will remain latched in its raised position after the actuator arm is restored to normal, the carriage stepped to the left and, normally, until a new value is entered in the next order.

Restoration of actuator arm

Figure 7:
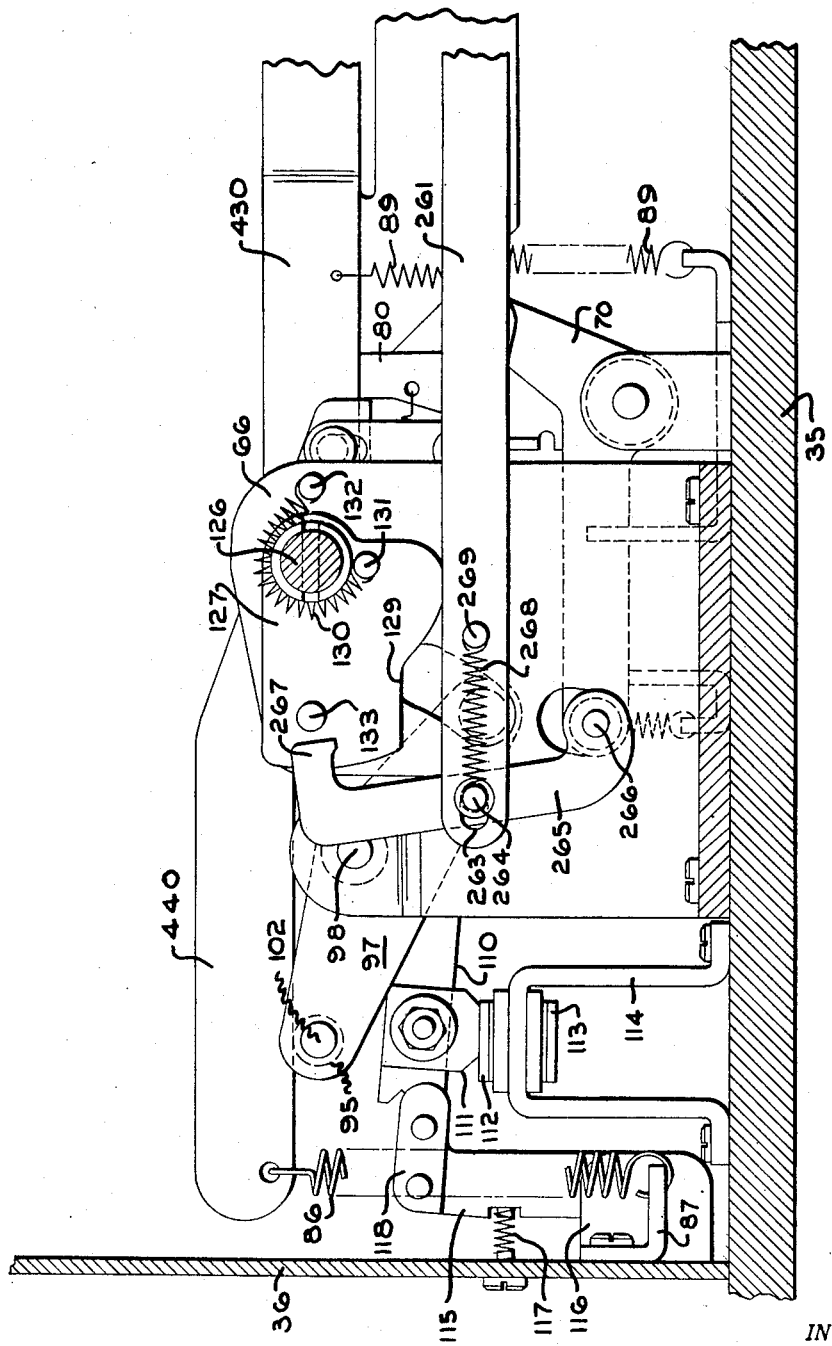
Fig. 7 is a rear view of the selection arm, and its associated mechanism taken on the vertical transverse plane indicated by the line 7—7 of Fig. 5B.

Underlying the actuating arms is a common bail 95 (Figs. 5B, 6 and 7). The bail is mounted in end plates 96 and 97 which in turn are mounted on a shaft 98 suitably journalled in brackets 66 and 67. The bail assembly is pulled in a counter-clockwise direction by any suitable means such as spring 99. A bracing bar 100, operating through slots 101 in the brackets 66 and 67, also connects the plates 96 and 97 and thus holds them in rigid spaced relationship and in correct alignment.

The forward end of the bail 95 is provided with a stud 102 which overlies the switch arm 110 (Figs. 5B and 7). The switch arm 110 carries an insulated member 111 which engages the upper leaf 112 of a contact switch comprising the leaf 112 and a second, or lower, leaf 113. The switch is mounted by any suitable means such as bracket 114 affixed to the base plate. The arm 110 is held in either adjusted position by a detent 115 mounted on bracket 116 and urged into engagement with the switch arm 110 by any suitable means, such as compression spring 117. Preferably the detent 115 is provided with guide plates 118 engaging the sides of switch arm 110 in order to prevent relative lateral displacement between the switch arm and the detent.

It is seen from the foregoing description that depression of a numeral key releases the corresponding actuator arm and permits it to be pulled clockwise in Fig. 6, or counter-clockwise in Fig. 7. Depression of the actuator arm depresses the bail 95 against the tension of the spring 99, thereby lowering the switch arm 110 to cause a closing of the switch 112—113.

The switch 112—113 is connected to an actuator restoring solenoid 125 (Figs. 5B and 6). Preferably this solenoid is of the rotary type, of well known manufacture, which provides a rotary throw of about 45°. The solenoid 125 rocks a stub shaft 126 (Figs. 5B and 7) which is keyed to the shaft 65. A pair of identically shaped cams 127 and 128 are pinned to the shaft 65 to rotate therewith, one cam being located at each end of the shaft 65 (Fig. 5B). The shape of the cams is shown in Figs. 7 and 8. Each cam is provided with a camming face 129 adapted to engage studs 134 and 135, respectively, at the back and front end of the bracing bar 100 upon actuation of the solenoid, thereby rocking that bar and the associated bail assembly (counter-clockwise in Fig. 7 and clockwise in Fig. 8). Such rocking of the bar 100 raises the outer end of the actuating arm, permitting it to again be latched by the spring-pressed pivot arm 80. The solenoid, shaft and cams are returned to their original position by any suitable means, such as spring 130, one end of which is attached to a pin 131 mounted on cam 127 and the other end of which is attached to a pin 132 mounted on the bracket 66.

Thus, depression of any numeral key releases the corresponding actuator arm, which is pulled clockwise by the spring 86. Such movement of the arm depresses the bail 95 to close the switch 112—113, which in turn operates the solenoid to depress the bar 100 and immediately restore the actuator arm to its original position. It will be noted, in Fig. 6, that the clockwise rotation of the actuator arm raises link 77, which in turn lifts the latch 75 from engagement with the ear 81 of the arm 80. Thus, the arm 80 immediately returns to its latching position regardless as to how long the key in question is depressed. The slot 84 in the link 77 permits displacement of the link and latch upwardly when the key is released. Thus, the actuator arm is immediately restored to its original position.

Simultaneously, with the restoring of the actuator arms to normal position, the switch 112—113 is opened so as to interrupt current to the restoring solenoid 125. The means for breaking the circuit is shown in Fig. 8 and comprises an arm 161 extending from the switch lever 97 to a point adjacent the cam 128. A roller 160 mounted on the cam engages the arm 161 of the switch lever and forceably moves the switch arm to the disengaged position, in which position it is held by the detent 115.

Entry of values into internal carriage

The mechanism for the entry of values from the selection arms into the selection segments of the carriage is best shown in Fig. 13. The carriage 140, which is shown in outline in Fig. 8, and in detail in Fig. 17, comprises the side plates 141 and 142 held in spaced relationship by suitable cross bars such as 179, 195, 206 and 281. For the present it is sufficient to note that the carriage slides on transverse bars 143 and 144 (Fig. 4) and is provided with a rack 145 which is adapted to be engaged by a carriage shifting pawl 150 to move the carriage to the left (Fig. 8). The carriage is normally pulled to the right hand, or home, position by a strong spring 146, as shown in Fig. 8.

As shown in Fig. 13, a sleeve 175 surrounds the supporting shaft 143. On this sleeve 175 is rotatably mounted a number of differentially settable selection segments 174, one for each order of the capacity of the machine. Associated with each segment 174 is a setting mechanism. As the selection segments and the cooperative mechanisms are identical, only one need be described in detail.

A shaft 171 mounted in the carriage extends transversely of the machine, and is shown in cross-section in Fig. 13. On this shaft is mounted a number of bellcrank latches 170, one for each selection segment 174. The upper arm of each bellcrank 170 is provided with a latching notch 172 which normally engages an ear 173 on the selection segment. It will be noted that the lower edge of the bellcrank latch 170 is provided with a notch 176 adapted to be engaged by the noses of the selection arms 431–439. The edge of this notch is placed at an angle to the side of the bellcrank, as it is desired to have a uniform stroke of the latch 170 irrespective of the distance from the shaft 171 at which the latch is engaged. The nose 470 for the zero selection lever 430 stands above the others for the purpose hereinafter to be described, and so requires an additional, and deeper, notch 177 whereby when it engages the bellcrank 170 it will move the crank only a distance equal to that of the other arms. The latch 170 is pulled clockwise into latching position by a suitable tension spring 172 stretched between the end of the arm 170 and a common bracket 169 carried by the carriage.

The entry of a value into the selection arms, by causing their noses 47 to rise, disengages the latch 170 and permits the selection segment 174 to rotate counterclockwise under the influence of spring 193 (Fig. 4). The segment 174 is provided on its lower edge with a stop 178 which engages the upwardly latched nose of the selection arm and thereby stops rotation of the selection segment. The amount of rotation of segment 174 is inversely proportional to the value of the key depressed. In the form shown eleven values are possible: a blank, the 9 to 1, inclusive, and zero. In Fig. 13 the segment stands in the blank position which is the position in which the selection segment is normally latched. The 9 value is next and represents the smallest amount of rotation of the selection segment. The value of zero is at the other extreme and represents the extreme amount of rotation. For this reason the nose 470 of the zero selection arm 430 is sufficiently high to always stop the selection segment at the zero position, if no numeral key is latched in raised position (as will happen when a multiple zero is entered into the machine).

The upper right hand portion of the selection segment is provided with a nose 180 adapted to engage the respective differential notches 671 of the selection slide 670 described in the parent application above-mentioned. The right hand edge of the selection segment is provided with a rack 181 of 11 teeth corresponding to the blank, 9 to 1, and zero positions (reading from top to bottom). The selection segment is normally latched by the bellcrank 170 in the blank position, in which it is shown in Fig. 13. The carriage is moved one step to the left almost simultaneously with the setting of a valve into the selection segment and as the selection segment has stopped at a differential position corresponding to the value entered, the notch 181 corresponding to such value will engage and slide upon the long detent 182 (see also Fig. 8) and thereafter be latched in that position. The detent 182 is pinned to a shaft 183 and is spring-pressed to engaged position by a suitable spring 184.

The selection segment is also provided with a forwardly extending arm 188 which carries a pin 189 engaging the bifurcated end of a bellcrank 190. The bellcrank 190, as shown in Fig. 4, is rotatably mounted on a shaft 191 extending across the carriage. The bellcrank is pulled clockwise by a relatively strong spring 193, one end of which is connected to the bellcrank and the other end of which is connected to a bar 194 mounted in the carriage. A comb 195 holds the bellcranks 190 in proper operational relationship. The upper end of the bellcrank 190 has a suitable pin and slot connection 196 with a second bellcrank 197 rockably mounted on a shaft 198. The free end of the bellcrank 197 carries a gear segment 199 which engages a gear segment 200 mounted on the register check dial 201, which is rotatably mounted on shaft 207. Thus, the check dial registers the value set in the selection segment 174. The check dial 201 also carries a gear segment 202 which is engaged by the nose 203 of a pawl 204 pressed into engagement with the check dial by a spring 205 tensioned between the free end of the detent 204 and a spacing bar 206 extending across the carriage.

The values differentially set in the selection segments 174 can be cleared by operation of the clear bail 186, the operation of which will be described hereafter.

*Carriage shifting*

The carriage is shifted step by step to the left from its initial position upon entry of a value in any order. The mechanism for stepping the carriage to the left is shown in detail in Fig. 8. As previously mentioned, the bail assembly for restoring the actuating arms is operated by a pair of identical cams 127 and 128, pinned to shaft 65, the cam faces of which contact the studs 134 and 135 of bar 100 to rotate the bail assembly counter-clockwise as viewed from the front. The cam 128 carries a carriage shifting pawl 150 which is pivotally mounted thereon by any suitable means, such as stud 152. The outer end of the pawl has a nose 151 adapted to engage the rack 145 of the carriage. The outer end of the pawl 150 is supported by a tension spring 153, one end of which is inserted over pin 154 on the bracket 67 and the other end of which is fastened to the pawl by any suitable means, such as pin 155. When the cam 128 is in its normal, or inoperative, position, the pawl is prevented from engaging the rack 145 by means of a roller 156 mounted on the bracket 67. However, as the cam 128 rotates clockwise (in Fig. 8) to relatch the actuator arm in its normal position, the pawl 150 is pushed to the left and thereupon can engage the rack 145, pushing the carriage one step to the left. The carriage is held in the adjusted position by means of a holding pawl 385 shown in Fig. 9 and described in detail hereafter.

Multiple zero entry

The machine of the present invention is provided with a mechanism for the automatic entry of from 2 to 9 zeros as desired by the operator. For this purpose a multiple zero, or tabulating key, 220 is provided. This key is shown in Fig. 1 as located below the value keys 1 and 2. This key is preferably mounted on a key stem 50 similar to those of the value keys. The key stem for this key engages an ear 219 on the right hand end of a lever 221 (Fig. 2) which is rockably mounted, as by pin 223, to a bracket 222 mounted on the base plate below the keyboard. The left hand end of the lever 221 underlies the forward end of a tabulating lever 224 which is pivoted on shaft 60. The rearward end of the tabulating lever terminates adjacent the upstanding end 228 (Figs. 5A and 12) of the bracket member 229, which bracket member has two relatively high sides 230 and 231 extending transversely of the machine and a relatively low, longitudinally extending end 245.

The rearward end of the tabulating lever 224 overlies (Fig. 12) stud 225 on the latch 226 which is pivoted, as by pin 227, to the upstanding end 228 of the bracket 229. The nose of the latch 226 overlies (see also Fig. 10) the horizontal arm of a bellcrank 232. The bellcrank is pinned to a longitudinal shaft 233 suitably journalled in the bracket 229. The upper end of the bellcrank 232 carries an ear 234 to which is attached the tension spring 235, the free end of which is affixed by any suitable means to the side of the bracket. This spring tends to rotate the bellcrank 232 counter-clockwise as viewed from the front, e. g. (Fig. 10).

The upper arm of the bellcrank carries a pin 236 which is engaged by the bifurcated end 237 of a second L-shaped lever 238 pivoted to the side 230 of the bracket, as by pin 239. A live pawl 240 is rockably mounted on the L-shaped lever, as by pin 241, and is pulled counter-clockwise by a tension spring 242. A stop pin 243 carried by the L-shaped lever prevents the pawl 240 from rotating counter-clockwise beyond the position shown. The effect of the depression of the tabulator key 220 is, therefore, to release bellcrank 232, which is pulled counter-clockwise by spring 235 to rotate the live pawl 240 clockwise (Fig. 10) to position it in operative relationship with the nose 285 of the three-arm lever 284 (Fig. 13) mounted in the carriage.

Simultaneously with the depression of the tabulating key 220, the operator will depress the numeral key corresponding to the number of zeros to be entered into the factor. As shown in Figs. 5A, 6 and 13, each of the selection arms 432 to 439, inclusive, carries a lower tabulating arm 452 to 459, inclusive, respectively, which is turned toward the front of the machine. The arms 452 to 459, inclusive, terminate in the respective tabulator stops 462 to 469, inclusive, arranged in a straight line across the machine as shown in Fig. 5A. These arms are differentially spaced a distance from each other corresponding to the spacing between adjacent orders in the carriage, and the tabulating ears are differentially cut, as shown in Fig. 6, so that when elevated by depression of the key each rises to the same level. Obviously, the tabulating ears 462 to 469, inclusive, are raised with the operation of the selection arm. The tabulating arms are not necessary for the keys 431 or 430, as tabulation would always be for a plurality of zeros. If a single zero is to be entered, the regular zero key would be used.

A tabulating mechanism is mounted on the carriage and is shown in detail in Fig. 13. This mechanism comprises a plurality of tabulating slides 280, one for each order of the machine. The slides 280 are mounted in the carriage upon a comb member 281 holding the slides against lateral displacement but permitting vertical sliding thereon. Each of the slides has a horizontal ear 282 at the lower end, as shown particularly in Figs. 14 and 17. It is seen from Figs. 13 and 17 that the upward movement of the tabulating arms 452 to 459 engages the slide thereabove, thereby moving such slide upwardly. If we refer to Fig. 17, it is obvious that elevation of the tabulating arm 462 (operated by the "2" key) will raise the leftmost slide, while depression of the 9 key would raise the slide 280 spaced eight positions to the right.

The upper end of each slide is pivotally connected to the left arm (as viewed in Fig. 13) of the three-arm lever 284 by any suitable means such as pin 283. The lever 284 is also mounted on the shaft 171, lying between the latch member 170 and the selection segment 174. The operation of the slide by one of the tabulating arms lowers the right hand nose 285 into a position to be engaged by the live pawl 240. The upper arm 286 of this lever is adapted to be engaged by the ear 187 on the selection segment, upon restoration of the segments to blank position, thereby rotating the three-arm lever counter-clockwise and depressing the slide to normal position.

The slides 280 are provided with a pair of detent notches 287 with which are associated a latch 288 pivoted on shaft 279 (shown in Fig. 4). The latches are pulled clockwise into latching position by a suitable spring 289. The latches may be provided with guides 291 to prevent lateral displacement with respect to its associated slide. A spring 290 attached to the three-arm lever 284 pulls the lever counter-clockwise and returns the slide 280 to normal position whenever the latch 288 is rocked counter-clockwise. The respective latches are held together by a tie bar 292, so that when any latch is rocked counter-clockwise by the raising of any slide 280 by its associated tabulating arm 452 to 459, all other latches are also rocked to release any previously set slide. Thus, whenever a new value is placed in the tabulating mechanism by any of the tabulating arms 462 to 469, any previously set arm 284 is returned to its inoperative position.

The shaft 233 upon which the bellcrank 232 (Fig. 10) is mounted extends from the bracket 230 rearwardly, the rearward end being journalled in bracket 246 (as shown in Fig. 5A). Adjacent the detent 256 an arm 250 is pinned to the shaft 233 (see Figs. 5A and 11). This arm carries a pin 251 which engages in a slot 252 in the wall 254 of the detent. Thus, the counter-clockwise rocking of the bellcrank 232 (as shown in Fig. 10) causes the arm 250 to rock the detent 256 (clockwise in Fig. 11) out of engagement with all of the selection arms and holds the detent out of engagement as long as the tabulating mechanism is in operation. It follows, therefore, that upon initial depression of a numeral key, simultaneously with the multiple zero key 220, that a selection arm (432 to 439) is raised to rock the bellcrank 170 and unlatch the selection segment 174. The segment rotates counter-clockwise until temporarily stopped by the upraised nose of the selection arm in question. However, as the detent is held out of engagement with the selection arm, the arm will immediately be returned to normal position by its spring 87, regardless of whether the operator holds the key depressed. Thereupon, the selection segment 174 will continue its rotation counter-clockwise until its nose 178 engages the elevated nose 470 of the zero selection arm. Thus, the value entered in the selection segments and in the check dials will always be zero when a value key and the tabulating key 220 are simultaneously depressed.

At the extreme rearward end of the shaft 233 is pinned an arm 260 (Figs. 5A and 13). A link 261 is pivotally attached to the arm 260, as by a pin 262. The right hand end of the link 261 (shown to the left of Fig. 7, which is a rear view of the mechanism) is provided with a slot 263 which embraces the pin 264 carried on arm 265. The arm 265 is pivotally mounted to the bellcrank 70 for the value of zero by means of pin 266. The upper end of the arm 265 is provided with a hook member 267 adapted to engage pin 133 fixed on cam 127. A tension spring 268 is mounted on the pin 264 and a pin 269 carried on link 261. Thus the counter-clockwise rotation of shaft 233 (as shown in Fig. 10) causes movement of the link 261, to the left (to the right as in Fig. 7). The spring 268 pulls the arm 265 clockwise until the tip of its hook 267 engages the pin 133. Thereafter, the cam is rotated (counter-clockwise in Fig. 7) by the actuation of the actuator arm, whereupon the hook portion 267 latches over the pin 133. When the cam returns clockwise, the hook 267, latched over the pin 133, raises the bellcrank 70 to automatically initiate the entry of another zero into the carriage. This automatic entry of the zero into the carriage continues until the tabulating mechanism is disengaged.

This disengagement of the tabulating mechanism occurs as follows: The live pawl 240 engages the nose 285 of the three-arm lever one order before the selected position. Movement of the carriage to the final position rocks the live pawl 240 counter-clockwise (as shown in Fig. 10), pivoting the pawl, and the arm 238 on which it is mounted, counter-clockwise. Such motion rocks the bellcrank 232 clockwise into position to become engaged by the latch 226. Such rocking of the bellcrank also rocks shaft 233, on which it is mounted, to return the detent 256 to its normal position to engage the noses of the selection arms and also pushes the link 261 to disengage the hook 267 from the pin 133 on cam 127. Thus, the entry of zeros into the selection segments and the step-by-step movement of the carriage to correspond thereto, is automatically terminated.

*Clearing*

Provision is made for clearing the register 31 and for erasing the value set in the selection mechanism (which also erases the value set in the check dials 32) by depression of a single key 370 (Fig. 1). The depression of this key operates two separate mechanisms, one for erasing values set in the selection mechanism and the second for initiating an operation to clear values accumulated in the accumulating mechanism and shown in the register 31. The first will now be described, while a description of the clearing of the accumulator will be found in the related applications.

The clear key and its associated stem are essentially the same as those of the value keys. Preferably, the key 370 is mounted above and behind the zero key 400 on the keyboard while the clear key lever 371 lies to the left of the zero key lever 410 (Fig. 2). The upraised forward end of the lever 371 carries a fixed stud 850, as shown in Fig. 2, which operates the mechanism for clearing the register as described in said related applications.

The clear key lever 371 is pivotally mounted on the bar 60 and terminates (Figs. 5A and 9 to 12) in an upstanding ear 369 that underlies the long arm 257 which forms the extension of side 255 of the detent 256. Thus depression of the clear key moves the detent to its releasing position and permits any selection arm then locked in a raised position to be returned to its normal position.

Simultaneously with the release of the selection levers by operation of the detent 256, the clearing mechanism operates to release the carriage rack 145 for return to its home, or blank, position by means of the spring 146. The mechanism for accomplishing this purpose is shown particularly in Fig. 9.

Adjacent the forward wall 231 of the bracket 229 (Fig. 9) the clear arm 371 is provided with a horizontal ear 373 which underlies a two-armed lever 375 rockably mounted on the bracket 231, as by pin 319. A pin 376 on the left end, as viewed in Fig. 9, of the lever 375 engages a slot 377 in vertical link 378. The link 378 is pivotally secured to an h-shaped member 379 by means of pin 380. The h-shaped member 379 is rotatably mounted on the bracket 231 by means of pin 381. A spring 382, stretched between a pin 383 on the h-shaped member and stop pin 327 mounted on the bracket, pulls the h-shaped member counter-clockwise. Thus, the holding pawl 385 formed on the upper arm of the h-shaped member normally engages the rack 145 of the carriage. However, depression of the clear key rocks the clear key lever 371 to depress the forward end and raise the rearward end thereof. Raising the rearward end of the clear key lever 371 rocks the lever 375 counter-clockwise, which pulls the h-shaped member 379 clockwise to disengage the pawl 385 from the rack, thereby permitting the carriage to be pulled to the right to its home position by the spring 146.

Provision is made for latching the h-shaped member in disengaging position so that the clear key may be released immediately without terminating operation of the carriage clearing mechanism. This is accomplished by means of a latch 388 which is rockably affixed to the bracket 231, such as by means of pin 389. The nose of the latch 388 is adapted to engage a pin 387 mounted on the upper arm of the h-shaped lever, when the h-shaped lever is rocked clockwise by depression of the clear key. The latch is pulled counter-clockwise by means of spring 390 tensioned between a pin 391 on the latch and the pivot pin 381. Thus, the h-shaped member is latched in disengaging position and the carriage can be returned to its home position by the spring even though the clear key is released.

The rack 145 is provided with an ear 147 which engages the latch 388 one space before reaching the home position of the carriage, whereby movement of the carriage to the home position pushes the latch off of the pin 387. Thereupon the spring 382 rocks the h-shaped member counter-clockwise to re-engage the pawl 385 with the rack 145.

It is also, as part of the clearing operation, necessary to restore the selection segments 174 to their blank position. This is accomplished by operation of the clearing bail 186 (Figs. 13 to 15). The bail 186 is mounted on a rockable bail operating plate 517 (Fig. 16) rockably mounted on shaft 143 adjacent the right side of the machine, and does not shift with the carriage. The bail itself, as shown in Fig. 15, extends only over the home position of the carriage so that its operation will clear only those segments which lie to the right of the units order of the register. Such a bail is necessary in order to permit clearing of a single selection segment if that is desired, as will be explained hereafter.

The mechanism for initiating operation of the clearing bail 186 is shown in Figs. 14, 15 and 16. As shown in these figures, a longitudinal shaft 471 is journalled in suitable bearings in brackets 482 and 483 secured to the right side wall 36, to the right of the home position of the carriage. At the forward end of the shaft 471, as shown in Fig. 14, is pinned an arm 485 which is engageable by the right side wall 142 of the carriage. Engagement occurs one space before home position so that return of the carriage to its home position rocks the arm 485 and shaft 471 counter-clockwise in Fig. 14 (clockwise in Fig. 15).

The rear end of the shaft 471 (refer to Figs. 15 and 16) carries two arms, the first of which, arm 472, is pinned to the shaft 471. Immediately adjacent the pinned arm 472 is an arm 473 which is loosely mounted on the shaft. A latching member 474 is pinned to the lower end of the pinned arm 472 and is pulled upwardly (clockwise in Fig. 15) by a spring 475 tensioned between a pin 476 on the latch 474 and pin 477 on the rotatable arm 473. The arm 473 carries an ear 478 adapted to be engaged by the latch 474 when the pinned arm 472 is rocked counter-clockwise (in Fig. 15) which occurs whenever the carriage leaves its home position and permits the arm 485 to rock one space to the left when viewed from the front (e. g. Fig. 14). Thus, with the insertion of the initial digit into the carriage, the carriage shifts one space to the left, permitting the arm 485 to follow it to rock the shaft 471 and the pinned arm 472 (counter-clockwise in Fig. 15). This pulls the latch 474 sufficiently far to enable it to engage the ear 478. When the carriage is returned to its home position, it rocks the arm 485, shaft 471, and the pinned arm 472. This then rocks the loosely mounted arm 473 (clockwise in Fig. 15). The arm 473 is normally pulled counter-clockwise by a spring 479 tensioned between an ear 480 on the arm and crosspiece 481 of the mounting bracket 483.

The lower end of the loosely journalled arm 473 is provided with a latching nose 484 which underlies the switch actuating arm 490. The switch actuating arm is pivotally mounted on the supporting bracket 489, as by means of pin 491, and is pulled downwardly (clockwise in Fig. 16) by means of tension spring 492 stretched between a pin 493 on the switch actuating arm and the pin 494 on the bracket 489. Thus, the clockwise rocking of the loosely journalled arm 473 (Fig. 15) releases the spring-powered switch-actuating arm 490. The switch-actuating arm 490 carries a stud 496 which engages the switch arm 497 pinned at 498 to the bracket 489. The switch arm 497 carries an insulating member 499 which engages the upper leaf 500 of a contact switch to press it against the lower leaf 501. The switch 500—501 is mounted on bracket 502 affixed to the base plate. The right hand end (Fig. 16) of the switch arm 497 is provided with two detent depressions 503 which are engaged by the nose of a detent 504 pivotally journalled on the pin 494. The detent 504 is pulled into engagement with the detent depressions 503 in the switch arm by a tension spring 505.

A clearing solenoid 510 (Figs. 14 and 15), preferably of the rotary type previously mentioned, receives its power supply through the switch 500—501 and is thereby actuated when the switch is closed by the means previously described. The solenoid 510 is keyed to an actuating shaft 511 (Fig. 16). A three-armed lever 512 is rigidly affixed to the shaft 511 and is thereby rocked by the solenoid. One arm 513 of the three-armed lever is pivotally connected to a link 514, as by pin 515. The other end of the link 514 is pivotally mounted on the bail operating plate 517, as by pin 516. The plate 517 which carries the restoring bail 186, is rotatably mounted on shaft 143, as by means of hub 518. Rocking of the restoring bail 186 restores all selection segments 174 lying within the home position of the carriage back to blank position (one space beyond 9).

A second arm 520 of the three-armed lever 512 is provided with an ear 521 which, upon rocking of the lever, lifts the switch actuating arm 490 to its latching position, in which position it is held by the arm 473.

The third arm 524 of the three-armed lever rocks downwardly to cause the ear 525 carried thereon to strike the extended upper arm 526 of the switch lever 497, thereby rocking the switch lever counterclockwise to disengaged position.

The switch actuating arm 490 carries a pin 523 which, when the switch operating arm is allowed to drop, engages the ear 522 on the lower end of the latching arm 474. Thus release of the switch actuating arm automatically disengages the latch 474 from the ear 475, permitting the loosely journalled arm 473 to return to its normal position where it can latch the switch actuating arm upon its immediate return to raised position. It will be understood, as was the case of the solenoid operated bail for restoring the actuator arms 440 to 449, that practically simultaneously with the release of the switch actuating arm 490 the switch is closed to energize the solenoid 510 to rock the bail 186, and simultaneously relatch the switch actuating arm 490 in its raised position and to rock the switch arm 497 to open the switch. Thus, there is an instantaneous and single actuation of the restoring solenoid upon return of the carriage to the home position.

*Back spacing*

Provision is also made for back spacing the carriage a single step and restoring only the last selection segment set. This permits the correction of an error in the entry of a digit into the machine without completely erasing the other figures of the factor. Operation of such a mechanism is initiated by depression of a back space key 300 which, as shown in Fig. 1, lies immediately below the value keys and to the right of the multiple zero, or tabulating, key 220. The key stem of the back space key 300 engages, when the key is depressed, an ear 302 on a two-armed lever 303 likewise pivotally mounted on bracket 222 (Figs. 2 and 3), as by pin 304. The left hand end of the lever 303 underlies a back space lever 305 pivoted on the shaft 60. The lever 305 extends rearwardly to a position intermediate the bracket walls 230 and 231, as shown in Fig. 12. This lever 305 terminates in a bifurcated end 306 which embraces a pin 311 carried on the forward end of a two-armed lever 312 which is pinned, as at 313, to a forwardly extending ear 245 of the bracket 230. The other end of the lever 312 extends rearwardly to underlie the extended arm 257 of the detent 256, so that depression of the back space key, which lowers the rear end of lever 305, raises the arm 257 to move the detent to releasing position.

Depression of the back space key also operates to release the carriage for a single step toward the right. The mechanism for accompanying this single step is shown in detail in Fig. 9. A bellcrank lever 320 is pivotally mounted on the pin 319. The right hand end of the bellcrank lever carries an ear 321 which immediately underlies the arm 305, so that the bellcrank 321 is rocked clockwise immediately upon depression of the back space key. The other arm 322 of the bellcrank extends upwardly, as shown in Fig. 9. A Y-shaped member 323 is pivotally mounted on the bracket wall 231, as on stud 324. The lower arm of this three-armed lever 323 carries a pin 325 whch lies against the upwardly extending arm 322 of the bellcrank, so that clockwise rotation of the bellcrank rocks the Y-shaped member counterclockwise. The Y-shaped member 323 is normally pulled clockwise by a spring 326 tensioned between the stop pin 327 riveted to the bracket 231 and a pin 328 carried by the Y-shaped member.

The rightwardly extending arm of the Y-crank carries a pin 329 which engages a slot 330 in a half-step pawl 331, which is pivoted to the bracket 231, as by stud 332. The pawl 331 has a nose 333 adapted to engage the rack 145 when the Y-shaped member is rocked counterclockwise. This pawl 333 engages the rack teeth in the half-step position so that the pawl nose 333 engages a tooth immediately upon rocking of the Y-shaped member, after which the rack is released to travel a half-step only toward the right, before being stopped by the pawl 333.

The third, or leftwardly extending, arm of the Y-shaped member carries a pin 334 which lies in the slot 386 in the h-shaped member 379. Thus, the rocking of the Y-shaped member 323 also depresses the holding pawl 385 to permit the rack to move to the right until stopped by the halfstep pawl 333. However, the slot 386 is so arranged that the holding pawl 385 cannot be depressed sufficiently to permit the latch 388 to engage the pin 387—that is, the motion imparted to the holding pawl 385 by the Y-shaped member 323 is only a portion of that imparted through depression of the clear key in order that the pawl cannot be latched in disengaged position by the back spacing mechanism. When the back space key is released, the bellcrank 320 and the Y-shaped member 323 will return to their normal position, from the force of the spring 326. Such rocking of the Y-shaped member will withdraw the half-step pawl 333 from engagement with the rack and simultaneously re-engage the holding pawl 385 with the rack thereby limiting the motion of the carriage to a single step toward the right.

The operation of the Y-shaped member to permit the stepping of the carriage a single space to the right also operates to close the switch 500—501 to energize the clearing solenoid 510.

As mentioned before, however, the clearing bail 186 extends only to those selection segments lying to the right of the center plate 38. Thus, the restoring bail 186 will restore only the one segment which has just been returned one space and will not effect restoration of those segments lying to the left thereof.

The mechanism by means of which the switch 500—501 is closed with each back stepping of the carriage is shown for the most part in Fig. 9. The pawl 331 carries a pin 335 which supports the left end of a link 340. The right end of the link 340 is pinned to the lever 485 (see Fig. 14) by any suitable means, such as stud 341. The link 340 is pulled counter-clockwise by a tension spring 342 stretched between the left end of the link and the pin 324. A stud 343 is affixed to the left end of the link 340 and so positioned that when the Y-shaped member 323 is rocked counter-clockwise to raise pawl 331, the stud 343 engages one of the teeth of the rack 145. The movement of the carriage to the right will, therefore, push the link 340 to the right to rock the actuating arm 485 counter-clockwise. It would be understood that the first motion of the rack 145 to the right is only half a step, due to the positioning of the pawl 333, and such motion will be insufficient to rock the arm 485 sufficiently to close the solenoid switch. However, when the back spacing key is released by the operator, the auxiliary pawl 333 is withdrawn from the rack 145 and simultaneously the holding pawl 385 moves into engagement with the rack, whereupon the rack moves another half step to the right. This latter step completes the rocking of the arm 485 sufficiently to close the solenoid switch 500'—501. The release of the auxiliary pawl 333 will not cause disengagement of the pin 343 of link 340 from the teeth of the rack 145. The half step movement of the carriage and rack will have pushed the link 340 to the right (in Fig. 9) half an ordinal spacing, thereby rocking arm 485 (Fig. 14) and shaft 471, thus forcing arms 472 and 473 (Fig. 15) against the tension of spring 479. The spring pressure will be sufficient to hold the pin 343 in engagement with the teeth of the rack 145. Release of the auxiliary pawl, and further movement of the rack to the right until blocked by holding pawl 385, operates to drop latch 474, whereby arm 472 becomes disengaged from arm 473. Spring 479, which exerts a force against arm 473 will thereafter have no effect upon arm 472, which rocks freely, thereby permitting the pin 343 and link 340 to become disengaged from the teeth of the rack.

Thus, with each back spacing of one order the segment restoring bail is actuated to restore to blank position the segment which has just returned to the home position of the carriage (i. e., the segment for the first order of the factor as it appeared before such back spacing). However, those segments, and their associated check dials, which lie to the left of the first order are not affected by such operation.

*Digitation*

The values so entered into the carriage 140 can be used for the setting of actuators, as described in the above-mentioned related applications. The setting of the actuators, and their operation during digitation, are not a part of this instant invention, and are therefore not described herein.

We claim:

1. A value entering mechanism for a calculating machine including a value storing mechanism having a plurality of differentially settable elements shiftable ordinally as a unit, ten value selecting devices respectively operative to insert a value of from "0" to "9" into said settable elements, power restoring means for said value selecting devices, means for shifting said value storing mechanism ordinally with the operation of said power restoring means, means for entering a predetermined plurality of zeros into the value storing mechanism comprising the combination of a multiple zero key, means enabled by said multiple zero key for rendering said selecting devices operative to enter a "0" value into the next operatively settable element, means operated by said key for latching the "0" value selecting device to the power restoring means for successively entering zeros into the settable elements, and means controlled by a value selecting device actuated simultaneously with the multiple zero key to terminate the successive entry of zeroes into the value storing mechanism after an entry of zeros corresponding to the value of the selecting device actuated, a detent means operable with said shifting means for retaining said settable elements in their adjusted positions, and latching means for holding said value storing mechanism in each ordinally shifted position.

2. A value entering mechanism for a calculating machine comprising a frame, an ordinally shiftable carriage having a plurality of differentially settable value storing elements, pressure means operative to rotate said value storing elements to a position corresponding to a value entered therein, latching means normally holding said value storing elements in a blank position, value selecting arms rockably mounted in said frame and operative to unlatch said last-mentioned latching means and to stop movement of said value storing elements in a position corresponding to the value to be entered, a detent for holding said elements in adjusted position, a spring-pressed actuating arm for each selection arm operative to move said selection arm to operative position, a latch for holding each said actuating arm in inoperative position, a ten-key keyboard mounted in said frame, means operated by each of said keys for unlatching the corresponding actuating arm, power operated means for restoring said actuator arms and shifting said carriage, a multiple zero control device, means controlled by a selected value selecting arm to predetermine movement of said carriage and operative with said multizero control to enter one of a plurality of zeros into said value storing elements, means controlled by said device for connecting the "0" latch releasing means to the power operated means for the successive entry of zeros, means controlled by a predetermined movement of the carriage for terminating operation of the "0" value selecting mechanism and enabling entry of numeral values thereafter into said value storing elements, and latching means for holding said carriage in each ordinally adjusted position.

3. In a calculating machine the combination of a value selecting mechanism for each numeral value including "0," a power operating means initiated thereby, an ordinally shiftable value storing mechanism having a plurality of settable elements for differential control by the selecting mechanisms, means for shifting said storing mechanism ordinally with operation of each said selecting mechanism, and means for entering a plurality of zeros into the value storing mechanism comprising a multiple zero control device, means controlled by said device for connecting the "0" value selecting mechanism to the power operating means, and tabulating means positioned by a value selecting mechanism operated simultaneously with said multiple zero control device and operable to disable said connecting means in a predetermined ordinal position of the value storing mechanism.

4. In a calculating machine including an ordinally shiftable value storing mechanism having a plurality of differentially settable elements, ten value entering mechanisms respectively operative to insert a value of from "0" to "9" into said settable elements, power restoring means for said value entering mechanisms and means for shifting said value storing mechanism ordinally operable with said power restoring means, means for entering a predetermined plurality of zeros into the value storing mechanism comprising the combination of a multiple zero key, means operative with said key for enabling entry of a "0" value into the storing means by a selected plural numeral value entering mechanism, means operated by said key for latching the "0" value entering mechanism to the power restoring means, and means controlled by a selected plural numeral value entering mechanism actuated simultaneously with the multiple zero key for releasing said latching means to terminate entry of zeros into the value storing mechanism after an entry of a plural number of zeros corresponding to the value of the value entering mechanism actuated.

5. In a calculating machine including an ordinally shiftable value storing carriage having a plurality of settable elements, ten value entering mechanisms respectively operative to insert a value of from "0" to "9" into said settable elements, power means operative to restore said mechanisms to initial position, and means for shifting said carriage ordinally by the operation of said value entering mechanisms, means for entering a successive plurality of zeros into the said elements comprising the combination of a multiple zero key, means operated by said key to cause entry of a "0" into a settable element by a selected numeral value entering mechanism and for operatively connecting the zero value entering mechanism to the power means, a plurality of selective ordinal disabling means for said key operated means, and means controlled by a value entering mechanism when actuated simultaneously with the multiple zero key to set a selected ordinal disabling means in operative position.

6. In combination with a calculating machine including an ordinally shiftable carriage having a plurality of settable elements, ten value entering mechanisms respectively operative to insert a value of from "0" to "9" into said settable elements, power restoring means operative to restore said value entering mechanisms to normal inoperative position, means effective with the operation of said value entering mechanisms to initiate operation of said power means, means controlled by said power means for ordinally shifting said carriage upon restoration of said value entering mechanisms, and means for entering a predetermined plurality of zeros into the settable elements of said carriage comprising a multiple zero control element, means for connecting the "0" value entering mechanism to said restoring means, a tabulating stop member operable to disconnect said connecting means and enable the numeral value entering mechanisms, a plurality of ordinally arranged actuating members in said carriage selectively positionable for operating said tabulating stop member, means operated by said control element for causing entry of "0" into said settable elements by a plural numeral value entering mechanism, for operatively adjusting said connecting means, and for setting the tabulating stop member to stopping position, and means positioned by a value entering mechanism actuated simultaneously with the multiple zero control element to operatively set a preselected actuating member into operative position.

7. In a calculating machine comprising a value selection mechanism including value keys for the values of "0" and "1" to "9," a value selecting element for each such key, power operated restoring means for restoring the value selecting elements to normal position, a shiftable carriage having a plurality of settable value storing elements for control by said selecting elements, and carriage shifting means operated by the restoring means, a multiple zero mechanism operable to initiate a zero entry by a plural numeral value key and to cause entry of a selected succession of zeros into the value storing elements comprising a tabulating arm carried by a selected plurality of the value selecting elements, a plurality of selectively operable tabulating members carried by said carriage and adapted to be operably adjusted by the tabulating arms, a tabulating stopping member operatively positionable for engagement by an adjusted tabulating member to disable said multiple zero mechanism, a multiple zero key, means controlled by the multiple zero key for setting the tabulating stop member into its operative position, and for connecting the "0" value selecting element to the power restoring means, whereby restoring of the concurrently operated plural value selecting element to its normal position automatically initiates operation of the zero selecting element successively until the adjusted tabulating member engages said stopping member.

8. A calculating machine comprising a frame, an internal carriage mounted therein, a plurality of differentially settable elements mounted in said carriage, latches normally holding said elements in a blank position, power means urging said elements to a value representing position, selection arms for each value from "0" to "9" mounted in said frame and operable to disengage said latches for the differentially settable elements and to differentially stop movement of such differential elements, latching means for latching said selection arms in an operated position, means for arresting said differentially settable elements at a zero representing position if no selection arms are latched in an operated position, a power driven actuating arm for each selection arm, a latch for holding each of said actuating arms in an inoperative position, a ten-key keyboard, means controlled by each key thereof for unlatching the latch on the corresponding actuator arm, an electrically operated means energized by any of said unlatched actuating arms to restore said arms to latched position, tabulating arms carried by the selection arms and spaced differentially parallel to the longitudinal axis of the carriage and spaced from one another a distance corresponding to the ordinal spacing in said carriage, ordinally spaced tabulating stop members mounted in said carriage each adapted to be moved to operative position by actuation of an underpositioned tabulating arm, a multiple zero mechanism, latching means for said multiple zero mechanism operative to hold said mechanism in an inoperative position, a multiple zero key for releasing said last named latching means and depressible simultaneously with a value key, a restore means for said multiple zero mechanism in positionable alignment with said tabulating stop members and, when positioned in operative position, operated by engagement with said members to relatch said multiple zero mechanism in inoperative position, said multiple zero mechanism controlled by the multiple zero key including means for rendering inoperative the said latching means for the selection arms, thereby setting the differentially settable element released by the concurrently operated value key to a zero representing position, and for positioning said restore means for engagement by a stop member, and a linkage to connect the zero actuating arm latch to the electrically operated means, such linkage being so arranged and constructed that each operation of such electrical means unlatches the latch for the zero actuating arm, thereby initiating operation of the zero selection arm for so long as the multiple zero mechanism is operative.

9. In a calculating machine, an ordinally shiftable value storage mechanism having a plurality of settable elements, a value selection mechanism operable to insert numerical values into the settable elements, means for shifting said storage mechanism upon the entry of each numerical value thereinto, and latching means for retaining said storage mechanism in adjusted position, a clearing means comprising the combination of power means operative to move said value storage mechanism to its initial position with the release of said latching means, a clear control member, means operative by said clear control member for disengaging said latching means and enabling said power means, electrical power means for restoring said settable elements to their value inserting position, a switch controlling the flow of power to said electrical power means, means operated by the movement of said value storage mechanism into its initial position for closing said switch, and means operated by said electrical power means for opening said switch.

10. In combination with a calculating machine having an ordinally shiftable value storing mechanism containing a plurality of settable storage elements, a value selection mechanism operable to insert numerical values into the settable elements, means for shifting said storing mechanism upon the entry of each numerical value thereinto, a clearing means for said value storing mechanism comprising spring means operative to move said value storing mechanism to its initial position, detent means for holding said value storing mechanism in each shifted position thereof, means for disengaging said detent means from said value storing mechanism and enabling said spring means, a latch for holding said detent means in disengaged position, an electrically operated means for restoring said settable elements to their inactive position for re-entry of values, a switch controlling the flow of power to said electrically operated means, means for closing said switch operated by said value storing mechanism when moved to its initial position upon release of said detent means, means operated by said electrically operated means for opening said switch, and means operative by said value storing mechanism in its initial position for disabling said latch means.

11. In a calculatng machine having an ordinally shiftable value storing mechanism having a plurality of settable storage elements, value selecting mechanism for differentially setting said elements order by order, means for shifting said value storing mechanism ordinally as values are inserted therein, spring means adapted to restore said value storing mechanism to its home position, and latching means for retaining said value storing mechanism in its adjusted position, a backspacing mechanism operative to return said value storing mechanism one step and to restore the last said settable element to its home position comprising the combination of a depressible key, a pawl positionable to limit the return of the value storing mechanism to a partial step only, means operated by said key to disengage said latching means and to simultaneously position said pawl in limiting position, a bail operative to restore said settable elements lying within the home position of said value storing mechanism to their original position, electrically operated means for operating said bail, a switch controlling the flow of power to said electrically operated means, a linkage operating said switch upon release of said key, and means operated by said electrical actuating means for opening said switch.

12. In a calculating machine, an ordinally shiftable value storing mechanism having a plurality of settable storage elements, a value selection mechanism adapted to ordinally insert values into said settable elements and to shift said value storing mechanism ordinally, power means for returning said value storing mechanism to its home position, latching means for holding said value storing mechanism in its adjusted position, a settable element restoring bail operative only in the space occupied by said value storing mechanism while in its home position, an electrical power means for operating said restoring bail, and a switch controlling the flow of power to said electrically operated means, means for selectively returning said value storing mechanism to its home position and restoring all of said settable elements to their original position or selectively to return said value storing mechanism one space and to restore said settable element then occupying the unit position therein which comprises a first key, a linkage operated by said first key to disengage said latching means from said value storing mechanism, means for holding said latching means in disengaged position, means operated by the return of said value storing mechanism to its home position to disengage said holding means, a linkage operated by the return of said storing mechanism to its home position to close said switch, a second key, a linkage operated by said second key to disengage said latching means from the value storing mechanism but to maintain said holding means inoperative, a second latching means operated by said second key and so constructed and arranged as to permit return of said value storing mechanism a partial ordinal distance only, whereby said value storing mechanism on depression of said second key is permitted to return a partial ordinal distance and upon release of said second key said second latching means is disengaged from said value storing mechanism and said first latching means is re-engaged therewith, a linkage positioned by said second latching means operatively connecting said value storing mechanism to said switch to close the same upon full ordinal movement of said value storing mechanism, and means operated by said electrical power means to open said switch.

13. In a calculating machine having an ordinally shiftable value storing mechanism having a plurality of settable storage elements, value selecting mechanism for differentially setting said elements, means for shifting said value storing mechanism ordinally as values are inserted therein, power means adapted to restore said value storing mechanism to its initial position, and holding means for retaining said value storing mechanism in each ordinally adjusted position, a backspacing control mechanism comprising a latch operative to maintain said holding means disengaged from the value storing mechanism for restoration thereof by said power means, a first key, a linkage operatively connecting said key to said holding means to disengage said holding means and effect operation of said latch, means operative with the restoration of said storing mechanism to release said latch, a pawl positionable to engage the value storing mechanism in a partial ordinal position for ordinal restoration of said storing mechanism, a second key, a linkage operatively connecting said second key to said holding means and said pawl to disengage said holding means and to simultaneously position said pawl for engagement with said value storing mechanism while preventing operation of said latch, a bail operative to restore said settable elements lying in a restored position of said value storing mechanism to their original position, electrically operated means for operating said bail, a switch controlling the flow of power to said electrically operated means, means operated by said value storing mechanism with restoration by said power means to close said switch, a member associated with said pawl and operatively positioned thereby for ordinal control of said switch closing means by said storing mechanism, and means operated by said electrically operated means for opening said switch.

14. A value entering mechanism for a calculating machine comprising a frame, an ordinally shiftable carriage having a plurality of differentially settable value storing elements, pressure means operative to rotate said value storing elements to a position corresponding to a value entered therein, latching means normally holding said value storing elements in a blank position, value selecting arms rockably mounted in said frame and operative to unlatch said last-mentioned latching means and to stop movement of said value storing elements in a position corresponding to the value to be entered, a detent for holding said elements in adjusted position, a spring-pressed actuating arm for each selection arm operative to move said selection arm to operative position, a latch for holding said actuating arm in inoperative position, a ten-key keyboard mounted in said frame, means operated by each of said keys for unlatching the corresponding actuating arm, a power means for relatching each said key released actuating arm, and a member operated by said key released actuating arm for initiating said power means.

15. A value entering mechanism for a calculating machine having a value selecting means for numeral values including "0," an ordinally shiftable carriage having a plurality of settable elements therein, means operable by said selecting means to set said settable elements, means for shifting said carriage ordinally with operation of said selecting means, manually controlled means operable to return said carriage to its initial position, a second manually controlled means operable to return said carriage a single order towards its initial position, power driven means for restoring said settable elements lying within a returned position of said carriage to their original value selecting position, and means operated by said carriage in the returned position thereof for energizing said power driven means.

16. In combination with a calculating machine including an ordinally shiftable value storing mechanism having a plurality of settable elements, ten value entering mechanisms respectively operative to insert a value of from "0" to "9" into said settable elements, and means for ordinally shifting said value storing mechanism in conjunction with the operation of a selected value entering mechanism, of means for entering a predetermined plurality of zeros into the value storing mechanism comprising a multiple zero control element, a tabulating stop member for terminating entry of such zeros, a plurality of ordinally arranged stop actuating members shiftable with said storing mechanism for operating said tabulating stop member, means operated by said control element concurrently with a plural numeral value entering mechanism for effecting the successive entry of the value of "0" into said settable elements and for setting the tabulating stop member to operative position, and means positioned by the plural numeral value entering mechanism to operatively set a preselected actuating member into operative position for engagement with said stop member.

17. In a calculating machine including a value selecting mechanism for the numeral values of "0" to "9," operating means therefor, a power operated restoring means for said operating means, a shiftable carriage having a plurality of differentially settable value storing elements controlled by said selecting mechanism, and means for shifting said carriage in conjunction with the operation of said selecting mechanism, the combination comprising a plurality of tabulating elements shiftable with said carriage, means controlled by the value selecting mechanism for positioning a predetermined one of the tabulating elements, adjustable means for connecting the "0" value selecting mechanism to said restoring means, a positionable tabulating stop member adapted to be operated by the positioned tabulating element for disconnecting said connecting means, a multiple zero key, means controlled by the multiple zero key for setting the tabulating stop member into its operative position, for causing entry of a "0" value into one of said settable elements by a plural numeral selecting mechanism operated concurrently with said key, and for adjusting said connecting means, whereby the resetting of the plural numeral value operating means to its normal position automatically initiates operation of the zero selection mechanism until the selectively positioned tabulating element operates said stop member.

18. In a calculating machine, an ordinally shiftable value storage mechanism having a plurality of settable storage elements, a value selection mechanism operable to differentially adjust said settable elements from a nonregistering to a registering position, and means for shifting said storage mechanism upon the registration of each numerical value therein, a clearing means comprising the combination of power means selectively operative to return said value storage mechanism uninterruptedly or order by order to the zone occupied by the settable elements from which they are successively presented to the selection mechanism for adjustment, power means for restoring those settable elements returned to the previously occupied zone to their nonregistering position, power control means for said last-mentioned power means, and means operated by said value storage mechanism upon return thereof for effecting operation of said power control means.

19. In combination with a calculating machine having an ordinally shiftable value storage mechanism containing a plurality of settable storage elements, a value selection mechanism operable to insert values into the settable elements, and means for shifting said storage mechanism upon the entry of each value thereinto, a clearing means for said value storage mechanism comprising means operative to unrestrainedly move said value storage mechanism to its original position, latch means for holding said value storage mechanism in a shifted position, means for selectively disengaging said latch means from said value storage mechanism to enable said moving means, power means for restoring said settable elements to their value entering position, a control means for determining operation of said power means, and means operated by the value storage mechanism for operating said control means.

20. In a calculating machine including a value selecting mechanism for each numeral value of 0 to 9, operating means therefor, a power operated restoring means for said operating means, a shiftable carriage having a plurality of value storing elements differentially adjustable by said selecting mechanisms, and means for shifting said carriage initiated by said operating means, the combination of means for entering a plurality of zeros into the value storing elements comprising a multiple zero key, means positionable by said multiple zero key and concurrently operable with a plural numeral selecting mechanism to determine entry of the first of a plurality of zeros into said value storing elements, and means controlled by the multiple zero key for connecting the 0 value selecting mechanism to the power restoring mechanism, whereby the restoring of the operating means to its normal position automatically initiates operation of the zero selection mechanism.

21. In a calculating machine having a value storing mechanism containing a plurality of settable elements, a value selecting mechanism for differentially setting said elements, means for shifting said value storing mechanism ordinally to an operative position as values are inserted therein, means adapted to return said value storing mechanism to an inoperative position, and latching means for retaining said value storing mechanism in a shifted position, a backspacing mechanism operative to return said value storing mechanism ordinally to restore the last set settable element to its value entering position comprising the combination of a depressible key, a blocking member positionable to engage the value storing mechanism in a partial ordinally returned position, means operated by said key to disengage said latching means and enable said return means, and to simultaneously position said blocking member in engaging position, a clear means operative to restore any of the settable elements lying within the inoperative position of said value storing mechanism to its value entering position, and a member associated with said clear means and operatively positioned by said blocking member for initiating operation of said clear means by the ordinal return of said storing mechanism.

22. In a calculating machine having a value entering mechanism the combination comprising, a shiftable carriage, a plurality of settable elements mounted in said carriage, means for successively positioning each of said elements in accordance with each selected value and for ordinally shifting said carriage into an operative position, power means operative to return said carriage to its inoperative position, a latch for holding said carriage in each shifted position thereof, backspacing means for disengaging said latch to enable said power means either for a single ordinal return to an inoperative position or until said carriage shall have returned to its initial position, and means operated by said backspacing means for initiating restoration to a non-registering position of one or more of the settable elements lying in the inoperative position of said carriage.

References Cited in the file of this patent

UNITED STATES PATENTS

| Number | Name | Date |
|---|---|---|
| 2,058,922 | Stickney | Oct. 27, 1936 |
| 2,061,362 | Lentz | Nov. 17, 1936 |
| 2,427,271 | Friden et al. | Sept. 9, 1947 |
| 2,538,896 | Britten, Jr. | Jan. 23, 1951 |